US012574149B2

(12) United States Patent
Sivasiva Ganesan et al.

(10) Patent No.: US 12,574,149 B2
(45) Date of Patent: Mar. 10, 2026

(54) FRER SUPPORT OF WIRELESS COMMUNICATION SYSTEM OPERABLE AS TSN BRIDGE

(71) Applicant: NOKIA SOLUTIONS AND NETWORKS OY, Espoo (FI)

(72) Inventors: Rakash Sivasiva Ganesan, Unterhaching (DE); Borislava Gajic, Unterhaching (DE); Peter Rost, Heidelberg (DE); Christian Mannweiler, Munich (DE); Christian Markwart, Munich (DE); Devaki Chandramouli, Plano, TX (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 429 days.

(21) Appl. No.: 18/029,971

(22) PCT Filed: Oct. 2, 2020

(86) PCT No.: PCT/EP2020/077643
§ 371 (c)(1),
(2) Date: Apr. 3, 2023

(87) PCT Pub. No.: WO2022/069058
PCT Pub. Date: Apr. 7, 2022

(65) Prior Publication Data
US 2023/0379081 A1 Nov. 23, 2023

(51) Int. Cl.
*H04L 1/08* (2006.01)
*H04L 47/28* (2022.01)
(Continued)

(52) U.S. Cl.
CPC ............... *H04L 1/08* (2013.01); *H04L 47/28* (2013.01); *H04L 47/34* (2013.01); *H04L 47/801* (2013.01); *H04L 69/40* (2013.01)

(58) Field of Classification Search
CPC . H04L 1/08; H04L 47/28; H04L 47/34; H04L 47/801; H04L 69/40
See application file for complete search history.

(56) References Cited

U.S. PATENT DOCUMENTS

2020/0259896 A1* 8/2020 Sachs ..................... H04L 67/12

FOREIGN PATENT DOCUMENTS

CN 110611924 A * 12/2019 ............ H04W 76/30

OTHER PUBLICATIONS

Time-Sensitive Networking Task Group of IEEE 802 1 of the: "IEEE P802.1 CB(TM)/O2.4 ; 802-1 CB-d2-4", IEEE Draft; 802-1 CB-O2-4, IEEE-SA, Piscataway, NJ USA, vol. 802.1 cb drafts, No. d2.4, Jun. 8, 2016 (Jun. 8, 2016), pp. 1-109.*

(Continued)

*Primary Examiner* — Mohammad S Adhami
*Assistant Examiner* — Samuel Dilan Rutnam
(74) *Attorney, Agent, or Firm* — Carter, DeLuca & Farrell LLP

(57) ABSTRACT

There are provided measures for enabling/realizing FRER support of a wireless communication system operable as a TSN bridge, such as e.g. FRER support of a 5GS TSN bridge. Such measures exemplarily comprise configuration of a wireless communication system operable as a TSN bridge, such as e.g. a 5GS TSN bridge, for supporting FRER functionality, wherein parameters relating to a stream identification function and at least one of a stream splitting function and a sequence recovery function are extracted from a FRER configuration, at least one network entity is identified, and FRER-related configuration information is provided for the identified at least one network entity, including at last part of the extracted parameters, for (Continued)

enabling realization of the stream identification function and the at least one of the stream splitting function and the sequence recovery function.

1 Claim, 14 Drawing Sheets

(51) Int. Cl.

| | | |
|---|---|---|
| *H04L 47/34* | (2022.01) | |
| *H04L 47/80* | (2022.01) | |
| *H04L 69/40* | (2022.01) | |

(56) References Cited

OTHER PUBLICATIONS

International Search Report & Written Opinion dated Jun. 24, 2021 corresponding to International Patent Application No. PCT/EP2020/077643.

3GPP TR 23.725 V16.2.0 (Jun. 2019), Technical Report, 3rd Generation Partnership Project; Technical Specification Group Services and System Aspects; Study on enhancement of Ultra-Reliable Low-Latency Communication (URLLC) support in the 5G Core network (5GC) (Release 16), Jun. 2019.

B. Barga et al., "DetNet Data Plane: MPLS over IEEE 802.1 Time Sensitive Networking (TSN) daft-ietf-detnet-mpls-over-tsn-02," Internet Draft, IETF, Mar. 6, 2020, pp. 1-13, XP015138142.

Time-Sensitive Networking Task Group of IEEE 802 1 of the: "IEEE P802.1CB (TM)/D2.4; 802-1CB-d2-4," IEEE Draft, Draft Standard for Local and metropolitan area networks—Frame Replication and Elimination for Reliability—Jun. 8, 2016, pp. 1-109, XP068109667.

3GPP TS 23.501 V16.5.1 (Aug. 2020), Technical Specification, 3rd Generation Partnership Project; Technical Specification Group Services and System Aspects; System architecture for the 5G System (5GS); Stage 2 (Release 16), Aug. 2020.

IEEE Computer Society. "IEEE Standard for Local and Metropolitan Area Networks-Timing and Synchronization for Time-Sensitive Applications." Jun. 19, 2020, pp. 1-421.

IEEE P802.1CB™/D2.4. "Draft Standard for Local and metropolitan area networks-Frame Replication and Elimination for Reliability." Jun. 13, 2016, pp. 1-109.

IEEE Computer Society. "IEEE Standard for Local and metropolitan area networks-Station and Media Access Control Connectivity Discovery." Mar. 11, 2016, pp. 1-146.

IEEE Computer Society. "IEEE Standard for Local and Metropolitan Area Networks—Bridges and Bridged Networks. Amendment 31: Stream Reservation Protocol (SRP) Enhancements and Performance Improvements." Oct. 31, 2018, pp. 1-208.

IEEE Computer Society. "IEEE Standard for Local and Metropolitan Area Networks-Bridges and Bridged Networks." Jul. 6, 2018, pp. Jan. 1993.

* cited by examiner

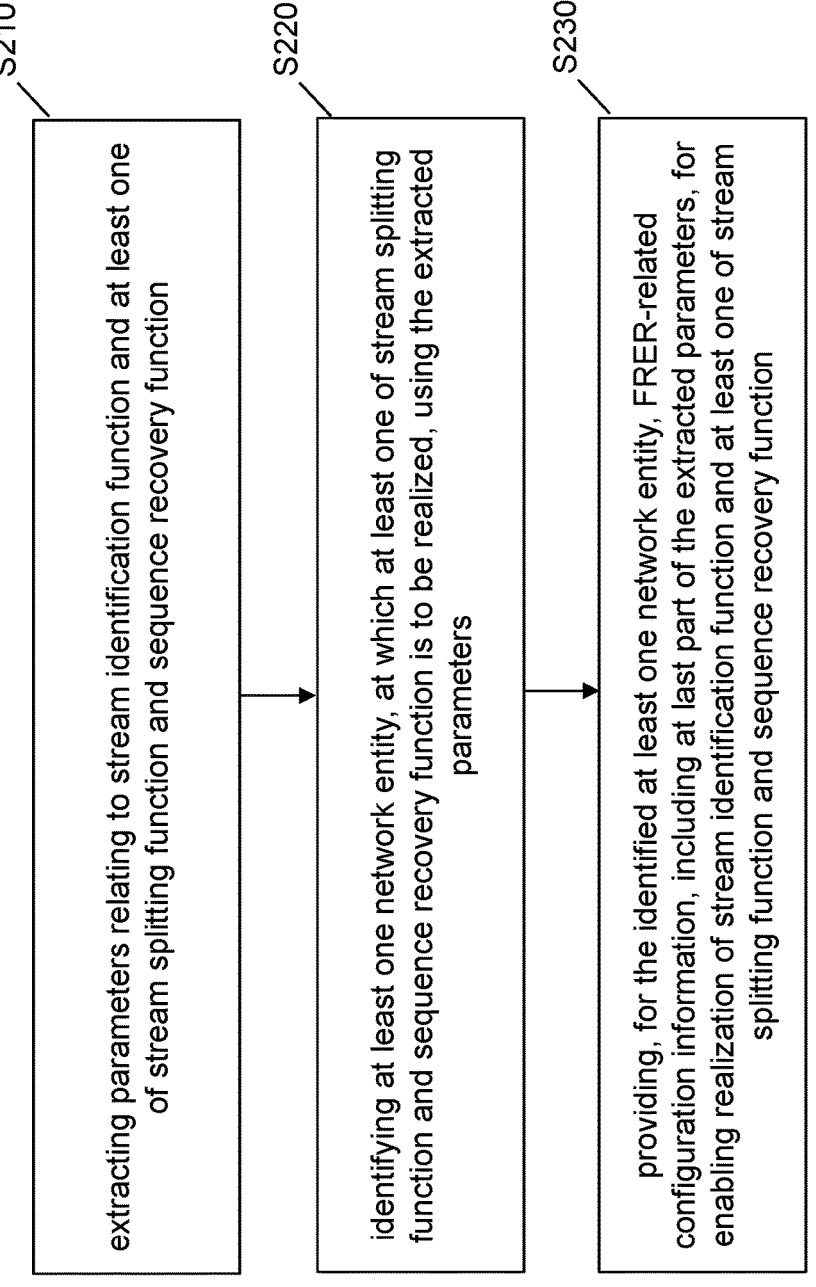

S210 extracting parameters relating to stream identification function and at least one of stream splitting function and sequence recovery function

S220 identifying at least one network entity, at which at least one of stream splitting function and sequence recovery function is to be realized, using the extracted parameters

S230 providing, for the identified at least one network entity, FRER-related configuration information, including at last part of the extracted parameters, for enabling realization of stream identification function and at least one of stream splitting function and sequence recovery function

Figure 2 extracting unit/means/circuitry 131 identifying unit/means/circuitry 132 providing unit/means/circuitry 133 causing unit/means/circuitry 134

130

FRER SUPPORT OF WIRELESS COMMUNICATION SYSTEM OPERABLE AS TSN BRIDGE

FIELD

The present disclosure relates to FRER support of a wireless communication system operable as a TSN bridge. More specifically, the present disclosure relates to measures/mechanisms (including methods, apparatuses (i.e. devices, elements and/or functions) and computer program products) for enabling/realizing FRER support of a wireless communication system operable as a TSN bridge.

BACKGROUND

For the present disclosure, tactile industrial networks, also known as Industrial IoT (IIoT) or Industry 4.0 networks, represent a target/application scenario. In such scenario, wireless (or mobile) communication systems such as 3GPP technologies are applied in addition to wired time-sensitive networking (TSN) to provide flexibility (in terms of mobility) and scalability (in terms of number of sensors, actuators or controllers).

Time-sensitive networking (TSN) provides industrial networks with deterministic delay to handle time-sensitive traffic. For TSN, a family of IEEE 802.1 standards, e.g. IEEE Std 802.1AS-2020, IEEE Std 802.1CB-2017, IEEE Std 802.1Q-2018, IEEE Std 802.1Qcc-2018 and IEEE Std 802.1AB-2016 (the contents of which is herewith incorporated by reference), are applicable to achieve deterministic data transmission with guaranteed low latency. In a TSN network, the traffic is handled in the form of streams (TSN streams) which are transferred via interconnected bridges (TSN bridges), and a TSN network is thus also referred to as a bridged network. Typically, wired links are assumed for connecting sensors, actuators and controllers and transferring TSN streams. Moving from wired to wireless connectivity provides advantages such as mobility, scalability, low cost maintenance, etc. To connect wireless devices to a TSN network, wireless transmission mechanisms are necessary, such as wireless communication systems as defined by 3GPP specifications.

In TSN, a functionality called Frame Replication and Elimination for Reliability (FRER) as defined in IEEE Std 802.1CB-2017 is applied in order to reduce the probability of frame/packet loss due to equipment failures when transferring a TSN stream via a bridged (TSN) network, thereby providing for an end-to-end reliability mechanism. This increased reliability (and availability) is achieved by transmitting multiple copies of the frames/packets belonging to a TSN stream through different/independent paths in the network. The FRER functionality is based on two basic mechanisms, namely (1) the stream splitting function (SSF), which contains sequence numbering and replicating every frame/packet in a first entity (either an end station or a bridge), and (2) the sequence recovery function (SRF), which eliminates frame/packet replicates and re-/merges (re-/joins) them into a single (recovered/reconstituted) stream in a second entity (either an end station or a bridge). That is, the FRER functionality transforms a stream into one or more linked member streams, thus making the original stream a compound stream. Accordingly, the FRER functionality is based on (the handling or processing of) a compound stream composed of one or more member streams (between SSF and SRF). As defined in the IEEE Std 802.1 TSN standard family, five functions form the central functionality of the FRER mechanism, namely (in the order from higher layers toward lower layers) sequencing function (including sequence generation function and sequence recovery function), stream splitting function, individual recovery function, sequence encode/decode function and stream identification function.

In 3GPP (Rel. 16), it is specified that a 5GS network can be transparently integrated with a TSN network, i.e. the 3GPP network provides wireless connectivity service to the TSN network. Specifically, 3GPP TS 23.501 (the contents of its current version (namely, 3GPP TS 23.501 V16.5.1), especially section 5.28 thereof, is herewith incorporated by reference), in section 5.28 thereof, defines how a 5GS is utilized to form (i.e. is modeled as) a 5GS TSN bridge that can be integrated in a bridged (TSN) network. In order to appear as a TSN bridge, the 5GS incorporates the so-called "TSN Translator" functions at the network side and the device side, which are called NW-TT (network-side TSN translator) and DS-TT (device-side TSN translator), respectively. Such translators include a set of functions that are supported either natively by the 5GS or via a proprietary implementation at the translators, including e.g. forwarding and queuing of TSN frames/packets with respect to schedules (which also includes TSN bridge functions as defined in the IEEE Std 802.1 TSN standard family).

While IEEE Std802.1CB-2017 defines the functions that are needed to realize FRER, i.e. to establish and handle/process redundant streams in a bridged (TSN) network, a 5GS acting as a (TSN) bridge is currently not enabled to support the FRER functionality.

Currently, support for FRER is excluded in the 3GPP specifications of 3GPP Rel. 16 and Rel. 17. Hence, if a 5G TSN bridge receives FRER configuration information from a control entity, e.g. centralized network configuration (CNC), it would be unable to process this information and translate it into a proper configuration of the 5GS for supporting the FRER functionality.

It should be noted that the reliability enhancements mechanism for URLLC, e.g. Packet Data Convergence Protocol (PDCP) duplication, can be used to improve the reliability of the 5GS, e.g. the 5GS TSN bridge as such, but this is independent of the end-to-end reliability mechanism introduced by FRER. Furthermore, for FRER support by the 5GS TSN bridge, reliability enhancement within the 5GS is neither mandatory nor sufficient.

Therefore, there is a need for measures/mechanisms for (enabling/realizing) FRER support of a wireless communication system operable as a TSN bridge, such as e.g. FRER support of a 5GS TSN bridge.

SUMMARY

Various exemplifying embodiments of the present disclosure aim at addressing at least part of the above issues and/or problems and drawbacks.

Various aspects of exemplifying embodiments of the present disclosure are set out in the appended claims.

The scope of protection sought for various embodiments of the invention is set out by the independent claims. The embodiments and/or examples and features, if any, described in this specification that do not fall under the scope of the independent claims are to be interpreted as examples useful for understanding various embodiments of the invention.

According to an example aspect of the present disclosure, there is provided a method (which is a method of configuring a wireless communication system, which is operable as a bridge entity in a time-sensitive networking environment, for supporting a frame replication and elimination for reliability, FRER, functionality), the method comprising: extracting, from a FRER configuration of the time-sensitive networking environment, parameters relating to a stream identification function and at least one of a stream splitting function and a sequence recovery function, identifying at least one network entity of the wireless communication system, at which the at least one of the stream splitting function and the sequence recovery function is to be realized, using the extracted parameters, and providing, for the identified at least one network entity of the wireless communication system, FRER-related configuration information, including at least part of the extracted parameters, for enabling realization of the stream identification function and the at least one of the stream splitting function and the sequence recovery function.

According to an example aspect of the present disclosure, there is provided an apparatus comprising at least one processor and at least one memory including a computer program code, wherein the at least one memory and the computer program code are configured, with the at least one processor, to cause the apparatus to perform (configuring a wireless communication system, which is operable as a bridge entity in a time-sensitive networking environment, for supporting a frame replication and elimination for reliability, FRER, functionality, including) extracting, from a FRER configuration of the time-sensitive networking environment, parameters relating to a stream identification function and at least one of a stream splitting function and a sequence recovery function, identifying at least one network entity of the wireless communication system, at which the at least one of the stream splitting function and the sequence recovery function is to be realized, using the extracted parameters, and providing, for the identified at least one network entity of the wireless communication system, FRER-related configuration information, including at least part of the extracted parameters, for enabling realization of the stream identification function and the at least one of the stream splitting function and the sequence recovery function.

According to an example aspect of the present disclosure, there is provided an apparatus (for (use in) configuring a wireless communication system, which is operable as a bridge entity in a time-sensitive networking environment, for supporting a frame replication and elimination for reliability, FRER, functionality), comprising means (or circuitry) for extracting, from a FRER configuration of the time-sensitive networking environment, parameters relating to a stream identification function and at least one of a stream splitting function and a sequence recovery function, means (or circuitry) for identifying at least one network entity of the wireless communication system, at which the at least one of the stream splitting function and the sequence recovery function is to be realized, using the extracted parameters, and means (or circuitry) for providing, for the identified at least one network entity of the wireless communication system, FRER-related configuration information, including at least part of the extracted parameters, for enabling realization of the stream identification function and the at least one of the stream splitting function and the sequence recovery function.

According to various developments/modifications, any one of the aforementioned method-related and/or apparatus-related example aspects of the present disclosure may include one or more of the following features:

the FRER configuration may comprise parameters relating to one or more of at least one input stream, at least one output stream, at least one ingress port for receiving the at least one input stream, at least one egress port for forwarding the at least one output stream, such as in at least one of a stream splitting table and a sequence recovery table, and/or extracting may comprise extracting and grouping the parameters corresponding to at least one port of at least one network entity of the wireless communication system, and/or identifying may comprise identifying one or more ports, at which the at least one of the stream splitting function and the sequence recovery function is to be realized, using the extracted parameters, and/or providing may comprise providing FRER-related configuration information for enabling realization of the stream identification function and the at least one of the stream splitting function and the sequence recovery function at the identified one or more ports of the identified at least one network entity of the wireless communication system, and/or enabling realization of the stream splitting function may comprise enabling mapping of at least one member stream of time-sensitive network traffic, which results from the stream splitting function, to at least one packet data unit session in the wireless communication system and/or at least one egress port of the identified at least one network entity of the wireless communication system, and/or enabling realization of the sequence recovery function may comprise enabling mapping of an output stream, which results from the sequence recovery function, to a packet data unit session in the wireless communication system or an egress port of the identified at least one network entity of the wireless communication system, and/or a packet data unit session or an egress port for mapping may be selected using one or more selection criteria including one or more of a destination medium access control address of a stream, stream forwarding information and port binding information defining binding between port and packet data unit session, and/or providing may comprise transferring the FRER-related configuration information to the identified at least one network entity of the wireless communication system using a management information container, and/or the management information container may be transferred to the identified at least one network entity of the wireless communication system so as to be transparent to other network entities of the wireless communication system, and/or providing may comprise mapping the FRER-related configuration information into service data flow information and action rules and causing, using the service data flow information and action rules, realization of a service data flow for deriving and providing at least one of a packet detection rule and a forwarding action rule corresponding to the FRER-related configuration information, and/or the method or operability may further comprise causing establishment of at least one quality-of-service flow, corresponding to a quality-of-service defined in the FRER configuration, for each stream of time-sensitive network traffic, which is subject to the FRER functionality and transported in the wireless communication system, and/or causing configuration of a service data flow for carrying each stream of time-sensitive network traffic, which is subject to the FRER functionality and transported in the wireless communication system, by deriving at least one of a packet detection rule and a forwarding action rule corresponding to stream forwarding information and/or stream filtering and policing information, and/or the stream splitting function and the sequence recovery function may comprise functions of the FRER functionality in accordance with IEEE Std 802.1CB, and/or the identified at least one network entity of the wireless communication system may comprise at least one of a network entity hosting a network-side time-sensitive networking translator, a network entity hosting a network-side time-sensitive networking translator and a user plane function, a network entity hosting a device-side time-sensitive networking translator, and a network entity hosting a device-side time-sensitive networking translator and a user equipment function, and/or the method or operability may be operable at or by a network entity of the wireless communication system, such as at least one of a network entity hosting a time-sensitive networking application function, a network entity hosting a policy control function and a network entity hosting a session management function, and/or the wireless communication system may comprise a 5G system, and/or the wireless communication system may comprise a system modelled as a 5G time-sensitive networking bridge in accordance with 3GPP TS 23.501.

According to an example aspect of the present disclosure, there is provided a method (which is a method of processing time-sensitive networking traffic in a wireless communication system, which is operable as a bridge entity in a time-sensitive networking environment, based on a frame replication and elimination for reliability, FRER, functionality), the method comprising: performing a stream identification function of identifying, for an arriving frame, whether a stream to which the frame belongs is a stream subject to processing based on the FRER functionality using at least one FRER-related configuration parameter relating to stream identification, and performing at least one of a stream splitting function and a sequence recovery function on the frame, if the stream to which the frame belongs is identified as a stream subject to processing based on the FRER functionality, using at least one FRER-related configuration parameter relating to stream splitting or sequence recovery.

According to an example aspect of the present disclosure, there is provided an apparatus comprising at least one processor and at least one memory including a computer program code, wherein the at least one memory and the computer program code are configured, with the at least one processor, to cause the apparatus to perform (processing time-sensitive networking traffic in a wireless communication system, which is operable as a bridge entity in a time-sensitive networking environment, based on a frame replication and elimination for reliability, FRER, functionality, including) performing a stream identification function of identifying, for an arriving frame, whether a stream to which the frame belongs is a stream subject to processing based on the FRER functionality using at least one FRER-related configuration parameter relating to stream identification, and performing at least one of a stream splitting function and a sequence recovery function on the frame, if the stream to which the frame belongs is identified as a stream subject to processing based on the FRER functionality, using at least one FRER-related configuration parameter relating to stream splitting or sequence recovery.

According to an example aspect of the present disclosure, there is provided an apparatus (for (use in) processing time-sensitive networking traffic in a wireless communication system, which is operable as a bridge entity in a time-sensitive networking environment, based on a frame replication and elimination for reliability, FRER, functionality), comprising means (or circuitry) for performing a stream identification function of identifying, for an arriving frame, whether a stream to which the frame belongs is a stream subject to processing based on the FRER functionality using at least one FRER-related configuration parameter relating to stream identification, and means (or circuitry) for performing at least one of a stream splitting function and a sequence recovery function on the frame, if the stream to which the frame belongs is identified as a stream subject to processing based on the FRER functionality, using at least one FRER-related configuration parameter relating to stream splitting or sequence recovery.

According to various developments/modifications, any one of the aforementioned method-related and/or apparatus-related example aspects of the present disclosure may include one or more of the following features:

the at least one of the stream splitting function and the sequence recovery function may be performed on the frame at one or more ports being identified by the at least one FRER-related configuration parameter relating to stream splitting or sequence recovery, and/or performing the stream splitting function may comprise creating at least one member stream for the stream, which is identified using the at least one FRER-related configuration parameter relating to stream identification, wherein the frame is replicated and, if not present, a redundancy tag is added to the frame in the created at least one member stream, and mapping the created at least one member stream to at least one packet data unit session in the wireless communication system and/or at least one egress port, and/or performing the sequence recovery function may comprise creating a recovered stream for the stream, which is a member stream of an initial stream, wherein the frame is merged into the recovered stream, and mapping the created recovered stream to a packet data unit session in the wireless communication system or an egress port, and/or a packet data unit session or an egress port for mapping may be selected using one or more selection criteria including one or more of a destination medium access control address of a stream, stream forwarding information and port binding information defining binding between port and packet data unit session, and/or the method or operability may further comprise deriving at least one of a packet detection rule and a forwarding action rule corresponding to stream forwarding information and/or stream filtering and policing information, and/or the stream splitting function and the sequence recovery function may comprise functions of the FRER functionality in accordance with IEEE Std 802.1CB, and/or the FRER-related configuration parameters may be provided by a network entity of the wireless communication system, such as at least one of a network entity hosting a time-sensitive networking application function, a network entity hosting a policy control function and a network entity hosting a session management function, and/or the stream splitting function may be performed at a network entity hosting a network-side time-sensitive networking translator, wherein the stream is input at an ingress port and member streams resulting from the stream splitting function are forwarded, via a network entity hosting a user plane function, to at least one of one or more egress ports of a network entity hosting a device-side time-sensitive networking translator and/or a network entity hosting a user equipment function and one or more egress ports of the network entity hosting a network-side time-sensitive networking translator, and/or the sequence recovery function may be performed at a network entity hosting a device-side time-sensitive networking translator and/or a user equipment function, wherein one or member streams of the stream are input at an ingress port and the recovered stream resulting from the sequence recovery function is forwarded to an egress port, and/or the sequence recovery function may be performed at a network entity hosting a network-side time-sensitive networking translator, wherein one or member streams of the stream are input at an ingress port and the recovered stream resulting from the sequence recovery function is forwarded, via a network entity hosting a user plane function, to at least one of an egress port of a network entity hosting a device-side time-sensitive networking translator and/or network entity hosting a user equipment function and an egress port of the network entity hosting a network-side time-sensitive networking translator, and/or the stream splitting function may be performed at a network entity hosting a network-side time-sensitive networking translator and a user plane function, wherein the stream is input at an ingress port of the network entity hosting a network-side time-sensitive networking translator and member streams resulting are created by a multicast mechanism at the network entity hosting a user plane function and forwarded to at least one of one or more egress ports of a network entity hosting a device-side time-sensitive networking translator and/or network entity hosting a user equipment function and one or more egress ports of the network entity hosting a network-side time-sensitive networking translator, and/or when performing the stream splitting function, a network entity hosting a network-side time-sensitive networking translator and a user plane function and a network entity hosting a device-side time-sensitive networking translator may exchange information for latent error detection, and/or the method or operability may be operable at or by a at least one network entity of the wireless communication system comprising at least one of a network entity hosting a network-side time-sensitive networking translator, a network entity hosting a network-side time-sensitive networking translator and a user plane function, a network entity hosting a device-side time-sensitive networking translator, and a network entity hosting a device-side time-sensitive networking translator and a user equipment function, and/or the wireless communication system may comprise a 5G system, and/or

the wireless communication system may comprise a system modelled as a 5G time-sensitive networking bridge in accordance with 3GPP TS 23.501.

According to an example aspect of the present disclosure, there is provided a computer program product comprising (computer-executable) computer program code which, when the program code is executed (or run) on a computer or the program is run on a computer (e.g. a computer of an apparatus according to any one of the aforementioned apparatus-related example aspects of the present disclosure), is configured to cause the computer to carry out the method according to any one of the aforementioned method-related example aspects of the present disclosure.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present disclosure are set out in the following.

By way of exemplifying embodiments of the present disclosure, FRER support of a wireless communication system operable as a TSN bridge, such as e.g. FRER support of a 5GS TSN bridge, can be enabled/realized. That is, exemplifying embodiments of the present disclosure provide various measures/mechanisms (such as functions, extensions of functions and procedures) that enable a wireless communication system (e.g. 5GS) TSN bridge, when it receives FRER configuration information from a control entity, e.g. centralized network configuration (CNC), to process this information and translate it into a proper configuration for supporting the FRER functionality and behave/operate in accordance with the (thus configured) FRER functionality.

BRIEF DESCRIPTION OF THE DRAWINGS

In the following, the present disclosure will be described in greater detail by way of non-limiting examples with reference to the accompanying drawings, in which FIG. 2 shows a flowchart illustrating an example of a method or process according to at least one exemplifying embodiment.

DETAILED DESCRIPTION

Figure 1:
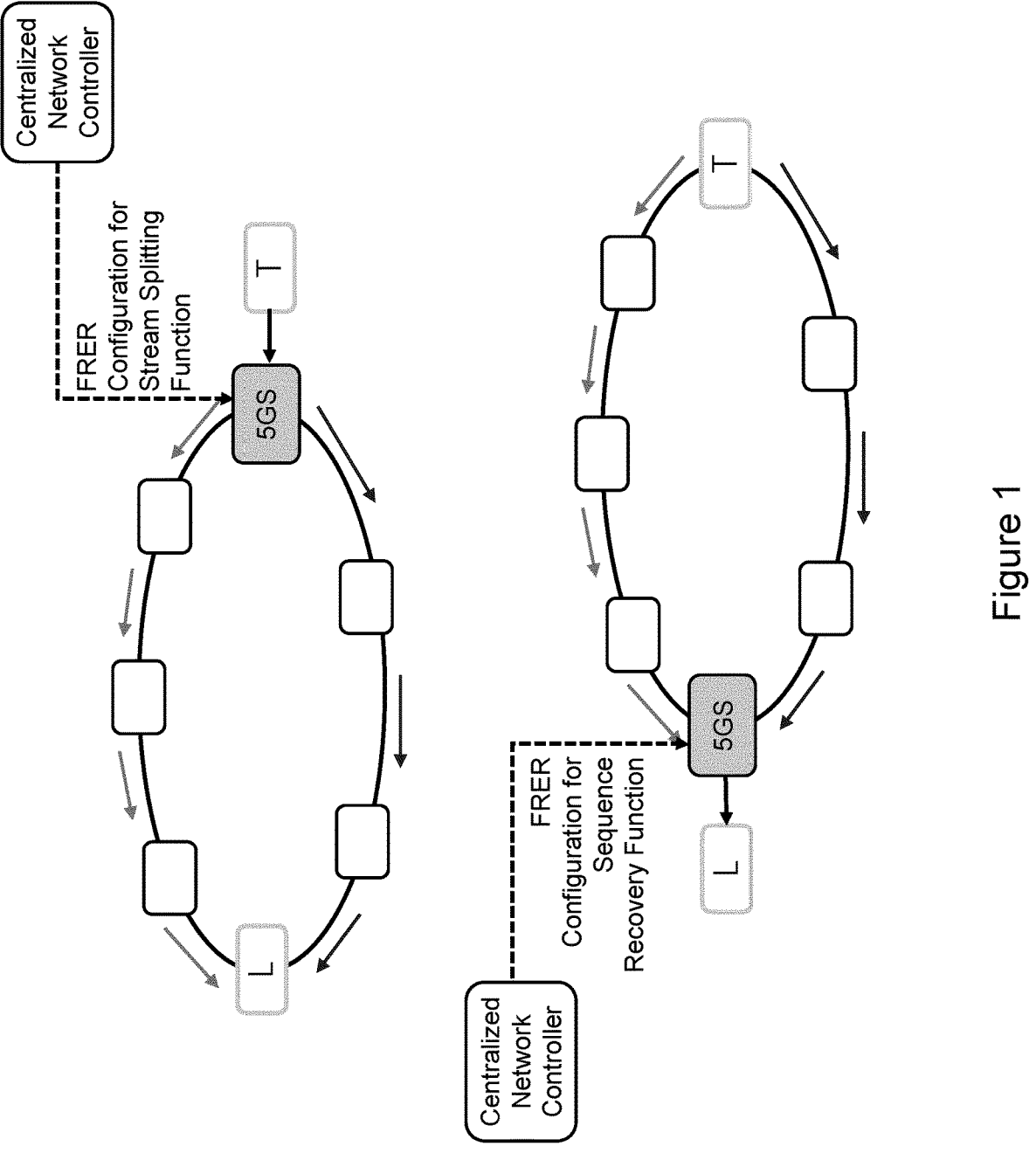
FIG. 1 shows a schematic diagram illustrating examples of FRER deployments in a bridged network using a 5GS TSN bridge according to at least one exemplifying embodiment.

The present disclosure is described herein with reference to particular non-limiting examples and to what are presently considered to be conceivable (examples of) embodiments. A person skilled in the art will appreciate that the present disclosure is by no means limited to these examples and embodiments, and may be more broadly applied.

It is to be noted that the following description mainly refers to specifications being used as non-limiting examples for certain exemplifying network configurations and system deployments. Namely, the following description mainly refers to time-sensitive networking according to IEEE standards and communication systems/technologies according to 3GPP specifications. As such, the description of exemplifying embodiments given herein specifically refers to terminology which is directly related thereto. Such terminology is only used in the context of the presented non-limiting examples and embodiments, and does naturally not limit the present disclosure in any way. Rather, any other network configurations and system deployments may equally be utilized as long as complying with what is described herein and/or exemplifying embodiments described herein are applicable to it. For example, any communication system, which is operable as a TSN bridge, is applicable in any networking scenario, which is suitable for time-sensitive networking, irrespective of the underlying standards or specifications.

Hereinafter, various exemplifying embodiments and implementations of the present disclosure and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown. In flowcharts or signaling diagrams, the illustrated order of operations or actions is generally illustrative/exemplifying, and any other order of respective operations or actions is equally conceivable, if feasible.

According to exemplifying embodiments of the present disclosure, in general terms, there are provided measures/mechanisms (including methods, apparatuses (i.e. devices, elements and/or functions) and computer program products) for enabling/realizing FRER support of a wireless communication system operable as a TSN bridge. By way of example only, the present disclosure refers to FRER support of a 5GS TSN bridge.

Generally, for exemplifying embodiments of the present disclosure, any kind, standardization, specification or implementation of a functionality corresponding to what is currently known as Frame Replication and Elimination for Reliability (FRER) is applicable. Insofar, the stream splitting function and the sequence recovery function, as addressed herein, comprise functions of the FRER functionality in accordance with IEEE standards, such as e.g. IEEE Std 802.1CB-2017 or any later version of IEEE Std 802.1CB, but are not limited thereto.

FIG. 1 shows a schematic diagram illustrating examples of FRER deployments in a bridged network using a 5GS TSN bridge according to at least one exemplifying embodiment.

As shown in the upper part of FIG. 1, a 5GS TSN bridge ("5GS") can be located at a stream splitting position. That is, the 5GS TSN bridge can realize a stream splitting function (SSF) based on a corresponding FRER configuration from a control entity such as a centralized network controller of the TSN network. In this role, the 5GS TSN bridge receives a stream from a talker ("T"), and splits the stream, thus making the original stream a compound stream composed of two member streams (in the illustrated example). The member streams are transferred via different paths, i.e. via different sets of bridges, towards a listener ("L").

As shown in the lower part of FIG. 1, a 5GS TSN bridge ("5GS") can be located at a sequence recovery position. That is, the 5GS TSN bridge can realize a sequence recovery function (SRF) based on a corresponding FRER configuration from a control entity such as a centralized network controller of the TSN network. In this role, the 5GS TSN bridge receives a compound stream composed of two member streams (in the illustrated example) from a talker ("T"), and re-/merges (re-/joins) the member streams into a single recovered/reconstituted stream which is then transferred to a listener ("L").

According to the present disclosure, it is described how the 5GS TSN bridge in any one of the aforementioned roles can be configured to support FRER, especially the corresponding stream splitting function or sequence recovery function, and how the (thus configured) 5GS TSN bridge in any one of the aforementioned roles can process TSN traffic based on FRER, especially the corresponding stream splitting function or sequence recovery function.

It is to be noted that a 5GS TSN bridge is basically operable as a single entity to support FRER from the perspective of the TSN network. The main difference of a 5GS TSN bridge as compared with a standard TSN bridge is that a standard TSN bridge is one physical entity, while a 5GS TSN bridge is composed of a plurality of network entities (functional entities). Hence, a standard TSN bridge can easily perform SSF/SRF at its ingress and egress ports based on the FRER configuration information received from the network management system, e.g. the CNC, while a 5GS TSN bridge has multiple (sets of) ingress and egress ports which are located at different network entities (functional entities) such that various (combinations of) ports at the device side and/or the network side need to cooperate to implement SSF/SRF. Hence, establishing an appropriate configuration for realizing an appropriate operation/behavior based on the FRER configuration information received from the network management system, e.g. the CNC, is required. However, the network management system, e.g. the CNC, has no knowledge of the internal structure of a 5GS TSN bridge, e.g. DS-TT (DS-TT/UE) and NW-TT (NW-TT/UPF), and can thus not provide any 5GS-specific configuration information.

According to the present disclosure, a 5GS TSN bridge is enabled to transform and forward a defined number M of input streams received via port(s) acting as ingress ports located at NW-TT and/or DS-TT(s) into a defined number N of output streams which are transmitted individually via port(s) acting as egress ports located at NW-TT and/or DS-TT(s) in any combination. The transformation and forwarding are performed according to a set of 5GS TSN bridge configuration information, which is received e.g. at the TSN AF from an external network entity, e.g. Centralized Network Configuration (CNC), where the set of 5GS TSN bridge configuration information is derived by the external network entity considering 5GS TSN bridge capabilities and stream requirements. The set of 5GS TSN bridge configuration information consists of parameters related to one or more of the input stream(s), the output stream(s), the ingress port(s) that receive(s) at least one input stream (from another bridge or end station) and the egress port(s) which transfer(s)/forward(s) at least one output stream (to another bridge or end station).

According to the present disclosure, the transformation and forwarding of each frame/packet of an input stream (which is an individual stream in case of SSF or a compound stream or a member stream of a compound stream) are based on 5GS TSN bridge configurations. On the one hand, an extended configuration parameter provisioning mechanism (such as e.g. an extended Block/Port Management Information Container (BMIC/PMIC) from e.g. TSN AF to DS-TT and/or NW-TT is provided to transfer configuration parameters to realize one or more of stream identification function (SIF), stream splitting function (SSF), stream recovery function (SRF), or combinations of them for an input stream. On the other hand, an extended DS-TT and/or NW-TT functionality is provided for one or more of identification if a received frame/packet belongs to an input stream based on SIF parameters, identification if a frame/packet of an input stream is a member stream of a compound stream or an individual stream e.g. based on SIF, SSF and SRF parameters, and identification of stream direction (i.e. uplink (UL) or downlink (DL)) e.g. based on SIF, per-stream filtering and policing (PSFP), ingress and egress port information, and static filtering entries, or the like.

According to the present disclosure, a FRER-based traffic processing mechanism can be as follows.

Firstly, a 5GS TSN bridge with features according to 3GPP Rel. 16 is assumed, i.e. UE has a single port, one DS-TT per UE, only one PDU session per UE and UPF, and only DL and UL scenarios (no NW-TT port to NW-TT port or DS-TT port to DS-TT port communication). In this regard, the following operations/functionalities are configured and operated in a 5GS TSN bridge for FRER support, i.e. to properly handle FRER streams/member streams, for the individual cases:

SSF/DL: Creating two or more member streams out of a single received input stream at NW-TT. Subsequently, mapping the member streams into one or multiple PDU sessions.

SSF/UL: Creating two or more member streams out of a single received input stream at DS-TT. Subsequently, mapping the member streams to multiple egress ports at NW-TT side.

SRF/DL: Receiving frames/packets of two or more member streams through two or more ingress ports at NW-TT. For each frame/packet sequence number, keeping the first received frame/packet with that sequence number from any of the member streams and discarding the frames/packets with the same sequence number of other member streams. Creating a single stream which is mapped to a single PDU session.

SRF/UL: Receiving frames/packets of two or more member streams through two or more PDU sessions at NW-TT. For each frame/packet sequence number, keeping the first received frame/packet with that sequence number from any of the member streams and discarding the frames/packets with the same sequence number of other member streams. Creating a single stream which is transferred via one or multiple egress ports at NW-TT according to traffic forwarding rules for the single stream.

In view thereof, the following is noted.

In order to support latent error detection as part of SRF, a 5GS bridge should be able to detect frames/packets missing in one of the FRER paths. For this purpose, NW-TT and DS-TT exchange information with each other to identify if any frame/packet loss is due to a missing frame/packet at the ingress port of the 5GS TSN bridge or frame/packet loss within the 5GS TSN bridge.

The member streams may have different header information than the input stream, namely a destination address shall be changed, and a R-Tag (redundancy tag) shall be added or removed.

Each PDU session or port is selected or decided using one or more selection/decision criteria. Such selection/decision criteria may be the destination MAC address provided by a stream, stream forwarding information (i.e. information provided by a forwarding table) and port binding information (i.e. information defining binding between port and PDU session) which are available for a PDU sessions (obtained during the PDU session establishment procedure).

Secondly, a generalized 5GS TSN bridge (which is not restricted to features according to 3GPP Rel. 16 and can be of any 3GPP specification including later versions/releases) is assumed, i.e. UE has multiple ports and there is NW-TT port to NW-TT port or DS-TT port to DS-TT port communication. In this regard, the following operations/functionalities are configured and operated in a 5GS TSN bridge for FRER support, i.e. to properly handle FRER streams/member streams, for the individual cases (discarding DL/UL differentiation):

SSF: Creating two or more member streams out of a single received input stream and mapping the member streams into at least one PDU session or at least two egress ports or at least one PDU session and one egress port.

SRF: Receiving frames/packets of two or more member streams through at least one PDU session or at least two ingress ports or at least one PDU session and one egress port. For each frame/packet sequence number, keeping the first received frame/packet with that sequence number from any of the member streams and discarding the frames/packets with the same sequence number of other member streams. Creating a single stream which is mapped to at least a single egress port and/or at least a single PDU session.

Further, in 5GS TSN bridge (in contrast to a standard TSN bridge), e.g. TSN AF can flexibly configure the FRER functionality in any of the user plane functions (network/ functional entities) and correspondingly adapt the QoS requirements for the TSN stream and/or member streams.

FIG. 2 shows a flowchart illustrating an example of a method or process according to at least one exemplifying embodiment.

The method or process of FIG. 2 relates to the bridge configuration aspect of the present disclosure, and can thus be referred to or understood as a method (for use in/by an apparatus capable) of configuring a wireless communication system, which is operable as a bridge entity in a time-sensitive networking environment, for supporting a frame replication and elimination for reliability, FRER, functionality.

The method or process of FIG. 2 is operable at or by one or more network entities or functional entities of a wireless communication system (as the aforementioned apparatus) which is operable as a TSN bridge, e.g. a 5GS TSN bridge. As described below, examples of these one or more network entities or functional entities can include a network/func- tional entity hosting (or being operable as or for) a time- sensitive networking application function (which may herein be referred to as "TSN AF"), a network/functional entity hosting (or being operable as or for) a policy control function (which may herein be referred to as "PCF") and a network/functional entity hosting (or being operable as or for) a session management function (which may herein be referred to as "SMF").

As shown in FIG. 2, a process (method) according to at least one exemplifying embodiment comprises an operation (S210) of extracting, from a FRER configuration of the TSN environment, parameters relating to a stream identification function and at least one of a stream splitting function and a sequence recovery function, an operation (S220) of iden- tifying at least one network entity of the wireless commu- nication system, at which the at least one of the stream splitting function and the sequence recovery function is to be realized, using the extracted parameters, and an operation (S230) of providing, for the identified at least one network entity of the wireless communication system, FRER-related configuration information, including at last part of the extracted parameters, for enabling realization of the stream identification function and the at least one of the stream splitting function and the sequence recovery function.

Figure 3:
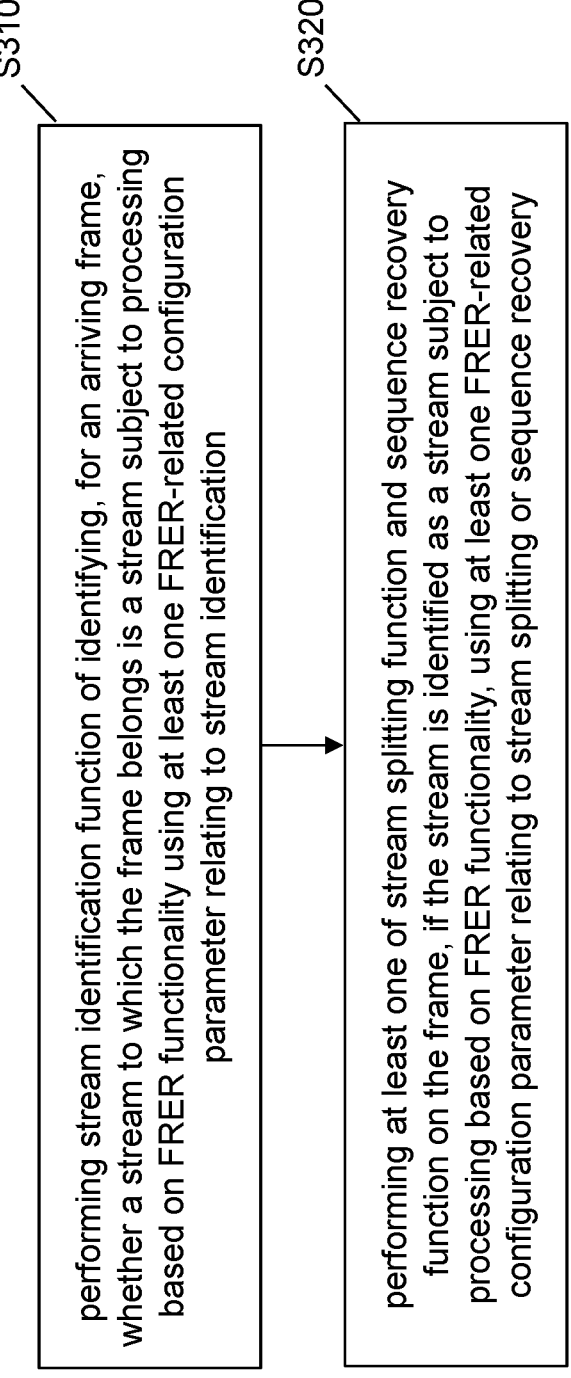
FIG. 3 shows a flowchart illustrating an example of a method or process according to at least one exemplifying embodiment.

FIG. 3 shows a flowchart illustrating an example of a method or process according to at least one exemplifying embodiment.

The method or process of FIG. 3 which relates to the bridge behavior/operation aspect of the present disclosure, and can thus be referred to or understood as a method (for use in/by an apparatus capable) of processing time-sensitive networking traffic in a communication system, which is operable as a bridge entity in a time-sensitive networking environment, based on a frame replication and elimination for reliability, FRER, functionality.

The method or process of FIG. 3 is operable at or by one or more network entities or functional entities of a wireless communication system (as the aforementioned apparatus) which is operable as a TSN bridge, e.g. a 5GS TSN bridge. As described below, examples of these one or more network entities or functional entities can include a network/func- tional entity hosting (or being operable as or for) a network- side time-sensitive networking translator (which may herein be referred to as "NW-TT"), a network/functional entity hosting (or being operable as or for) a network-side time- sensitive networking translator and a user plane function (which may herein be referred to as "NW-TT/UPF" or "UPF/NW-TT"), a network/functional entity hosting (or being operable as or for) a device-side time-sensitive net- working translator (which may herein be referred to as "DS-TT"), and a network/functional entity hosting (or being operable as or for) a device-side time-sensitive networking translator and a user equipment function (which may herein be referred to as "DS-TT/UE" or "UE/DS-TT"). As shown in FIG. 3, a process (method) according to at least one exemplifying embodiment comprises an operation (S310) of performing a stream identification function of identifying, for an arriving frame, whether a stream to which the frame belongs is a stream subject to processing based on the FRER functionality using at least one FRER-related configuration parameter relating to stream identification, and an operation (S220) of performing at least one of a stream splitting function and a sequence recovery function on the frame, if the stream to which the frame belongs is identified as a stream subject to processing based on the FRER function- ality, using at least one FRER-related configuration param- eter relating to stream splitting or sequence recovery.

In the following, details of exemplifying embodiments relating to the bridge configuration aspect of the present disclosure are described. It is to be noted that the bridge configuration aspect of the present disclosure generally refers to a control plane or signaling procedure to configure the necessary functions and parameters to provide for FRER support, i.e. to configure SSF/SRF within a wireless-com- munication-system TSN bridge such as a 5GS TSN bridge.

Hereinafter, for the sake of convenience, "TSN AF" stands for a network/functional entity hosting (or being operable as or for) a time-sensitive networking application function, "PCF" stands for a network/functional entity host- ing (or being operable as or for) a policy control function, "SMF" stands for a network/functional entity hosting (or being operable as or for) a session management function, "NW-TT/UPF" or "UPF/NW-TT") stands for a network/ functional entity hosting (or being operable as or for) a network-side time-sensitive networking translator, possibly together with a user plane function, and "DS-TT/UE" or "UE/DS-TT") stand for a network/functional entity hosting (or being operable as or for) a device-side time-sensitive networking translator, possibly together with a user equip- ment function.

For the illustrative case of a 5GS TSN bridge, it is exemplarily assumed that TSN AF is the network entity that handles/implements the configuration.

First, TSN AF receives a FRER configuration, e.g. from the CNC of the TSN network. From the received FRER configuration, TSN AF extracts stream splitting information/ parameters and sequence recovery information/parameters, e.g. entries of a stream splitting table and sequence recovery table corresponding to the port(s) of each of the network entities, i.e. NW-TT, DS-TT(s). The thus extracted information/parameters can be grouped accordingly. The frerSplit-Port and frerSeqRcvyPortList element of each entry of the stream splitting table and sequence recovery table, respectively, provide the information about the ports at which the SSF and the SRF are to be instantiated/realized. It is to be noted that there is one entry per stream splitting function and one entry per sequence recovery function in the corresponding tables, respectively.

Subsequently, TSN provides the relevant information/parameters to the ports at which the SSF and the SRF are to be instantiated/realized. Namely, the associated network entities and their ports are identified, and the configuration thereof is effected by providing the relevant information/parameters.

Figure 4:
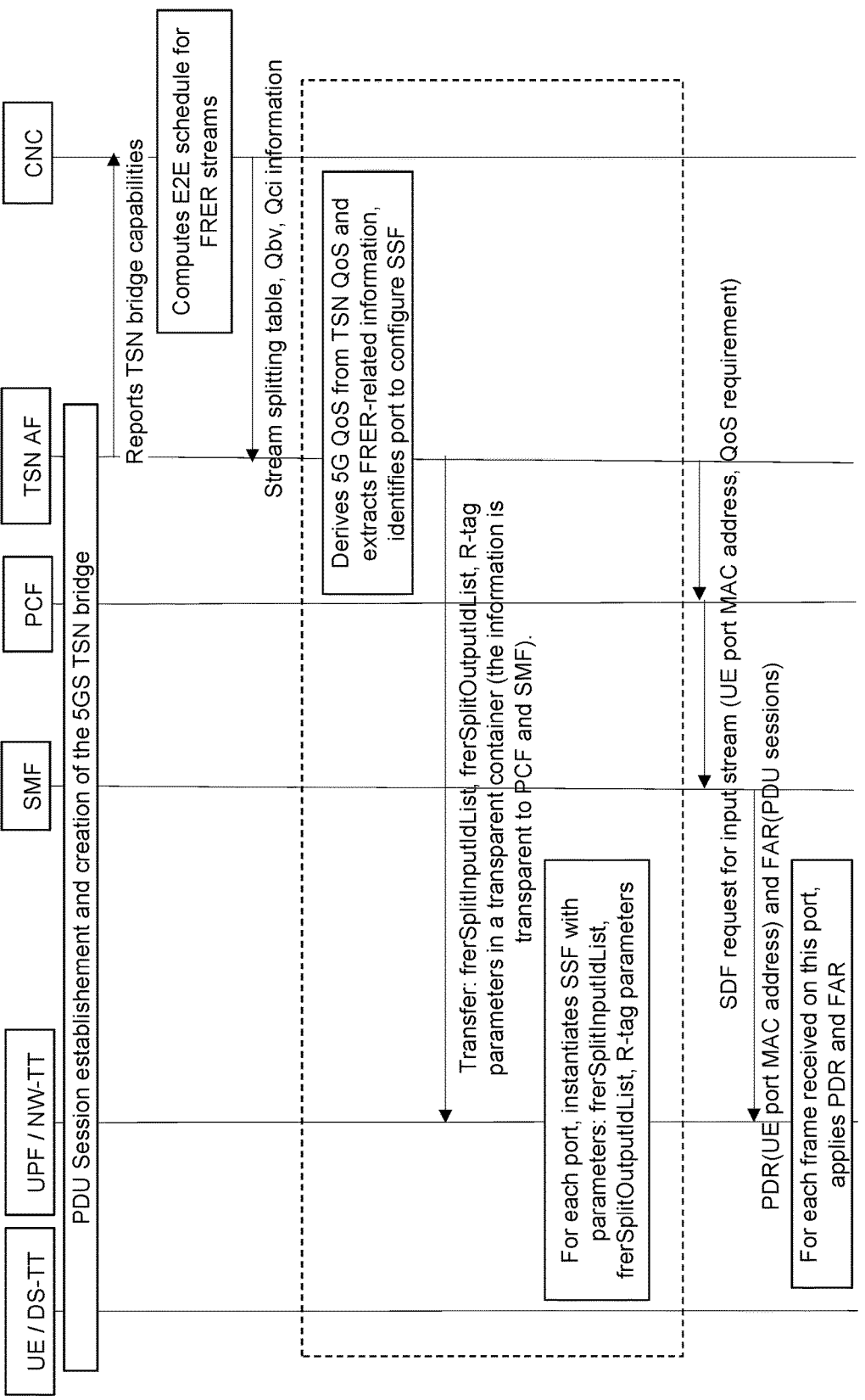
FIG. 4 shows a conceptual signaling diagram illustrating an example of a procedure or flow according to at least one exemplifying embodiment.
Figure 5:
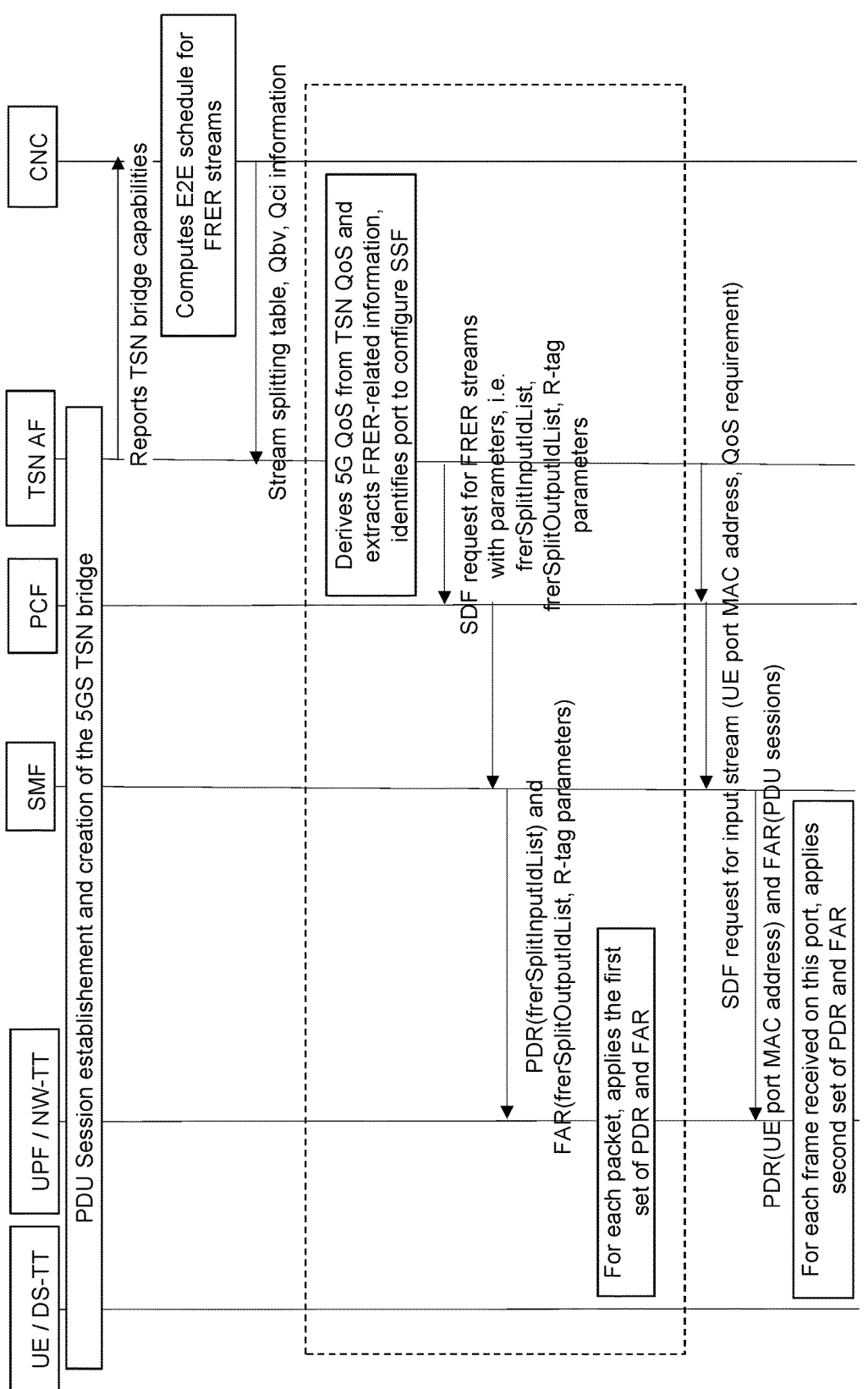
FIG. 5 shows a conceptual signaling diagram illustrating another example of a procedure or flow according to at least one exemplifying embodiment.

For providing the relevant information/parameters, two options are taught according to the present disclosure (which are illustrated in FIGS. 4 and 5).

In a first option, which may be referred to as transparent option, the relevant information/parameters, namely frer-SplitInputIdList and frerSplitOutputIdList for SSF and frerSeqRcvyStreamList for SRF, are provided to NW-TT and DS-TT using a transparent container, namely a container which as such, or the contents of which, is transparent to intermediate network entities such as PCF and SMF. Such transparent container can be a new container to be specified in standard/specification or an existing container to be re-/used, e.g. an extended an extended Block/Port Management Information Container (BMIC/PMIC).

Based on the thus provided information/parameters, NW-TT (using the FRER-related information/parameters provided by TSN AF at UPF) is configured to and can thus perform the necessary procedures to realize SSF and/or SRF. This includes one or more of the following:

creation of the member streams listed in frerSplitOutputIdList from the input stream listed in frerSplitInputIdList (for SSF), or creation of the recovered stream from the member streams listed in frerSeqRcvyStreamList (for SRF), deriving and configuring PDR and FAR rules at the UPF to map the member or recovered streams appropriately to the correct ports or PDU sessions (wherein, in order to derive PDR and FAR rules, NW-TT shall be provided with port binding information, or TSN AF shall request PCF/SMF to establish PDR and FAR rules for the member streams), establishing or re-using the existing (best-effort) PDU session for communication between NW-TT and DS-TT to identify if a frame/packet of a member stream is lost within the 5GS TSN bridge or already at the ingress of the 5GS TSN bridge in order to support the latent error detection function (for SRF).

Similar to NW-TT, based on the thus provided information/parameters, DS-TT (using the FRER-related information/parameters provided by TSN AF at UE) is configured to and can thus perform the necessary procedures to realize SSF and/or SRF. Accordingly, reference is made to the above description relating to NW-TT for details. It is to be noted that no PDR and FAR rules are necessary to be configured at the UE, because, as per 3GPP Rel. 16 specification, there is only one PDU session to which both the member streams are forwarded to (UL case, stream splitting) or received from (DL case, stream recovery). In the UL stream splitting case, NW-TT is to be configured appropriately so that the two or more member streams received through a single PDU session are forwarded to the appropriate egress ports.

In a second option, which may be referred to as SDF option, the relevant information/parameters, namely frer-SplitInputIdList and frerSplitOutputIdList for SSF and frerSeqRcvyStreamList for SRF, are provided to NW-TT and DS-TT re-/using 5GS SDF framework. Namely, TSN AF re-/uses 5GS SDF framework to request the establishment of at least one service data flow (SDF) to construct multiple member streams out of the single input stream (stream splitting) or combine multiple input streams into a single stream (stream recovery).

To support this option, an extension to the current SDF framework in 3GPP is proposed. Namely, if stream splitting and stream recovery are to be realized in the UPF using PDR and FAR rules, GTP-U payload modification shall be supported for enabling modification of the MAC destination address of one or more member streams. Additionally, TSN AF shall request the PCF/SMF to establish PDR and FAR rules for the member/recovered streams.

It is to be noted that some actions e.g. PSFP rules for DL are to be applied to the member streams/recovered stream at the NW-TT, as per 3GPP Rel. 16 specification. In case of the SDF option, the member streams are created at the UPF (and not at NW-TT) and hence the PSFP rules cannot be applied. For this reason, the transparent option could be beneficial for implementation from 3GPP specification perspective.

FIG. 4 shows a conceptual signaling diagram illustrating an example of a procedure or flow according to at least one exemplifying embodiment. In the procedure or flow of FIG. 4, which illustrates the aforementioned transparent option, details of a control plane or signaling procedure are outlined, which exemplifies how a stream splitting function (SSF) for FRER support is configured/realized at UPF/NW-TT.

First of all, it is assumed that a PDU session establishment has been completed between DS-TT/UE, NW-TT/UPF, SMF, PCF and TSN AF, and the 5GS TSN bridge is formed by a set of UEs/DS-TTs and the associated NW-TT/UPF. The relevant parameters, namely Bridge ID, DS-TT port number and MAC addresses, NW-TT port number and MAC address are provided to the TSN AF. Namely, the 5GS system exposes its FRER capability along with other TSN capabilities such as e.g. Qbv support to the TSN AF. Then, PDU sessions corresponding to each of the UE are established, wherein the PDU sessions that are associated to a given UPF along the corresponding UE ports constitute the 5GS bridge.

In a preparation phase, the TSN AF reports the 5GS TSN bridge capabilities, which may include bridge delay (pre-configured at the TSN AF) and other bridge information/MIBs such as e.g. topology information, to the control entity or management system of the TSN network, e.g. CNC. That is, 5GS TSN bridge parameters are exposed to the control entity or management system of the TSN network, e.g. CNC.

The CNC received the QoS requirements for each stream either from the CUC or from the edge bridge of the TSN network.

Based on the 5GS TSN bridge capabilities provided by the 5GS TSN bridge (i.e. the TSN AF) and stream requirements (e.g. E2E requirements regarding reliability or availability, such as QoS requirements for each stream) provided by either the CUC or the edge bridge of the TSN network, the CNC computes scheduling information such as e.g. Qbv and Qci information for each stream including the FRER member streams (wherein Qbv refers to enhancements for scheduled traffic, which is a functionality defined in IEEE Std 802.1Qbv-2015 and now contained in IEEE Std 802.1Q-2018, and Qci refers to per-stream filtering and policing, which is a functionality defined in IEEE Std 802.1Qci-2017 and now contained in IEEE Std 802.1Q-2018, and the contents of these standards are herewith incorporated by reference). The CNC provides, to the 5GS TSN bridge (i.e. the TSN AF), the scheduling information, which also includes a FRER configuration of the TSN network, including appropriate parameters, especially stream splitting table and/or sequence recovery table. For the present example case of SSF configuration, the parameter that defines how to create member streams out of the single input stream is given by the stream splitting table.

The TSN AF receives the FRER configuration and extracts the necessary parameters. That is, the TSN AF extracts the FRER-related information and transforms them into corresponding configuration/parameters or procedures to be executed by 5GS system. This is an example corresponding to operation S210 in FIG. 2 above.

The TSN AF identifies where to configure the SSF function using the extracted configuration/parameters. This is an example corresponding to operation S220 in FIG. 2 above.

In this regard, the following options are conceivable.

The frerSplitPort parameter specified in the stream splitting table can be used to identify the port/s (and thus also the network entity) where to configure the SSF function.

The 5GS TSN bridge consists of exactly one UPF, and the NW-TT at the UPF is where almost all of the TSN-related functionalities are executed. Also, the UPF is the central entity in that all the packets in the 5GS TSN bridge go through the UPF. Hence, the SSF function can be configured at the UPF.

If two egress ports belong to the same UE, the TSN AF can decide to configure the SSF at the UE. This allows to use the air interface resources efficiently. In this regard, it is noted that, as an optional feature, the TSN AF can configure the reliability enhancement mechanisms defined for URLLC to enhance the reliability of such transmission. Further, it is noted that the egress ports are not explicitly specified in the stream splitting table but, from the frerSplitOutputIdList parameter, the member stream destination address can be derived, and the egress ports can be obtained using the forwarding table.

Once the network entity (and the port/s) at which the SSF function is to be realized is derived, the TSN AF provides the necessary parameters or rules to the corresponding network entity (and the port/s). In the present example, the network entity for configuring/realizing the SSF function is the UPF. Accordingly, in the transparent option, the FRER-related parameters, namely frerSplitInputIdList, frerSplitOutputIDList, R-tag (redundancy tag) parameters or a set of parameters derived based on the above, are provided/transmitted to and configured at the UPF using a transparent container. This is an example corresponding to operation S230 in FIG. 2 above.

Further, the TSN AF can request the PCF/SMF to establish the required QoS flow/s, e.g. with QCI values derived based on the member stream QoS configuration. For example, in case the SSF (UL) is at UE1 and the egress port for a member stream is at UE2, there is one QoS flow from UE1 to UPF and another from UPF to UE2, and these QoS flows are established. That is, the bridge configuration aspect can comprise causing, e.g. by the TSN AF, establishment of at least one quality-of-service flow, corresponding to a quality-of-service defined in the FRER configuration, for each stream of time-sensitive network traffic, which is subject to the FRER functionality and transported in the wireless communication system.

Further, the TSN AF can request the PCF/SMF to configure PDR and FAR rules for the member streams (in addition to other TSN streams), e.g. based on the forwarding table and Qci information for the input stream to be subjected to the SSF function, and the SMF can configure the PDR and FAR rules at the UPF/NW-TT, as is indicated below the dashed box. In the illustrated example, the UE port MAC address is given in/for/as the PDR and the PDU session is given in/for/as the FAR. That is, the bridge configuration aspect can comprise causing, e.g. by the TSN AF, configuration of a service data flow for carrying each stream of time-sensitive network traffic, which is subject to the FRER functionality and transported in the wireless communication system, by deriving at least one of a packet detection rule and a forwarding action rule corresponding to stream forwarding information and/or stream filtering and policing information Upon reception of frames/packets for which the SSF function is configured and is thus to be performed, the SSF function is instantiated/realized at the UPF/NW-TT with the thus provided and configured parameters or rules. Namely, the PDR and FAR rules, which are configured for the member streams, are applied at the UPF/NW-TT. Details of how the SSF function is performed are given below in connection with the bridge behavior/operation aspect of the present disclosure.

FIG. 5 shows a conceptual signaling diagram illustrating another example of a procedure or flow according to at least one exemplifying embodiment. In the procedure or flow of FIG. 5, which illustrates the aforementioned SDF option, details of a control plane or signaling procedure are outlined, which exemplifies how a stream splitting function (SSF) for FRER support is configured/realized at UPF/NW-TT.

The procedure or flow of FIG. 5 is basically similar to that of FIG. 4. Hence, reference is made to the above description for FIG. 4, and only the difference (which lies within the dashed box) is described.

As indicated above, the difference between the transparent option (illustrated in FIG. 4) and the SDF option (illustrated in FIG. 5) resides in how the FRER-related configuration information is provided to the network entity (and the port/s) at which the SSF function is to be realized. Namely, in the SDF option, the FRER-related parameters, namely frerSplitInputIdList, frerSplitOutputIDList, R-tag (redundancy tag) parameters or a set of parameters derived based on the above, are mapped into service data flow (SDF) parameters and action rules. These SDF parameters and action rules are then provided/transmitted to the PCF, and the PCF derives PDR and FAR rules to realize the SSF function. These PDR and FAR rules are then provided/transmitted to and configured at the UPF through a N4 session by/via the SMF. In the illustrated example, the frerSplitInputIdList parameter is given in/for/as the PDR and the frerSplitOutputIDList, and the R-tag (redundancy tag) parameters are given in/for/as the FAR. This is an example corresponding to operation S230 in FIG. 2 above.

While the above-described examples relate to a use case in which a stream splitting function (SSF) for FRER support is configured/realized at UPF/NW-TT, similar/equivalent operations and functionalities apply for other use cases in equal measure. As an example, in case of configuration/realization of a sequence recovery function (SRF) for FRER support at UPF/NW-TT, corresponding/required parameters are provided from TSN to UP/NW-TT, such as frerSeqRcvyStreamList, in any one of the applicable options. As another example, in case of configuration/realization of a stream splitting function (SSF) and/or a sequence recovery function (SRF) for FRER support at UE/DS-TT, UE/DS-TT replaces UPF/NW-TT in the above description, i.e. as a destination for parameter provision and configuration.

In the following, details of exemplifying embodiments relating to the bridge behavior/operation aspect of the present disclosure are described. It is to be noted that the bridge behavior/operation aspect of the present disclosure generally refers to a user plane or traffic handling/processing procedure to treat arriving frames/packets appropriately based on FRER, i.e. to realize SSF/SRF within a wireless-communication-system TSN bridge such as a 5GS TSN bridge.

Hereinafter, for the illustrative case of a 5GS TSN bridge, it is exemplarily assumed that UPF (UPF/NW-TT) is the network entity that realizes/performs the FRER functionality, especially the stream splitting function and/or the sequence recovery function (based on the configuration established by the above-described bridge configuration aspect).

Basically, the FRER-based traffic processing mechanism according to the bridge behavior/operation aspect of the present disclosure is as outlined above, and (in order to avoid repetition) reference is made to the above description regarding the operations/functionalities which are configured and operated in a 5GS TSN bridge for FRER support, i.e. to properly handle FRER streams/member streams, both for the case of a 5GS TSN bridge with features according to 3GPP Rel. 16 and the case of a generalized 5GS TSN bridge (which is not restricted to features according to 3GPP Rel. 16).

Figure 6:
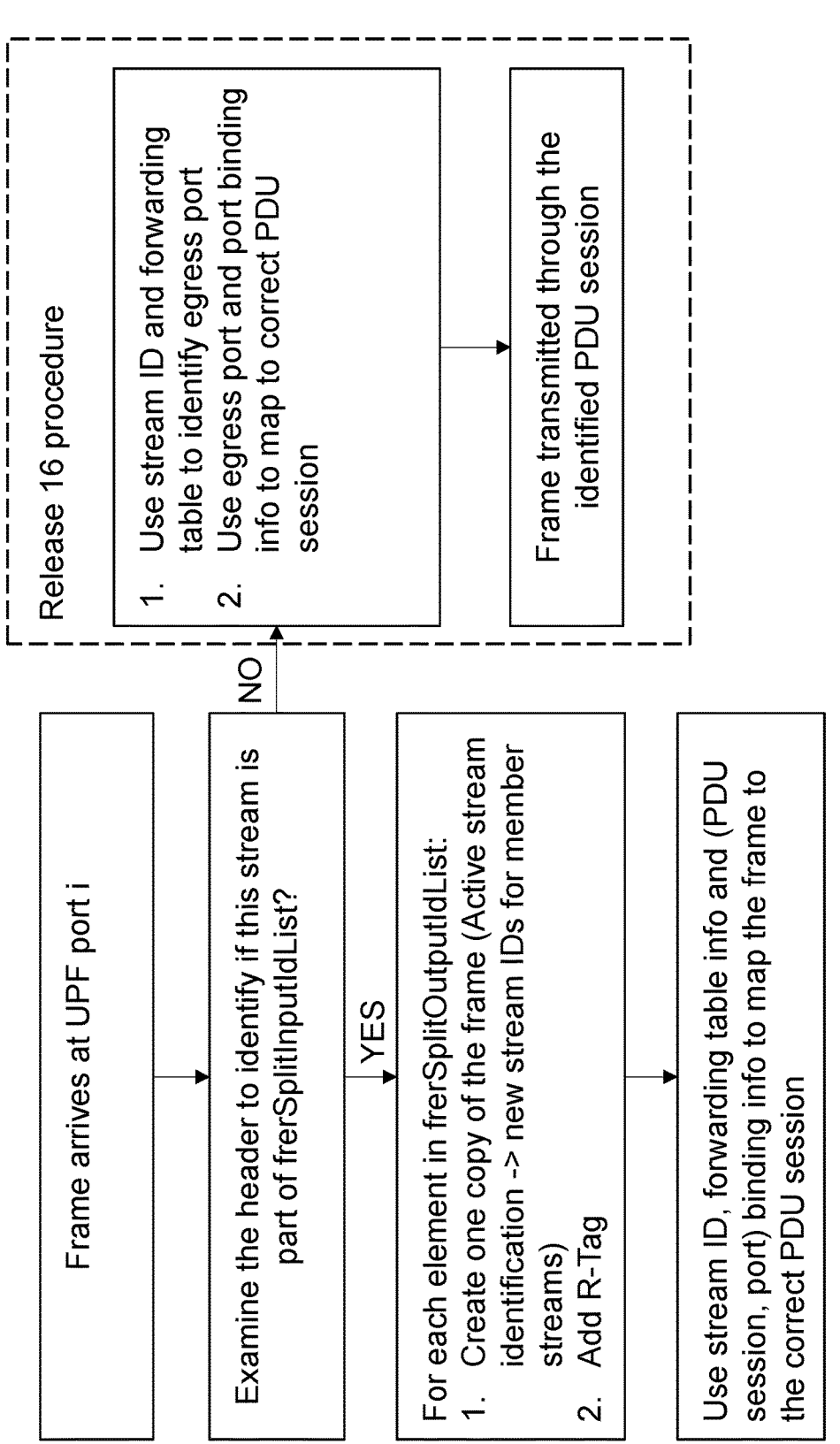
FIG. 6 shows a flowchart illustrating still an example of a method or process according to at least one exemplifying embodiment.

FIG. 6 shows a flowchart illustrating still an example of a method or process according to at least one exemplifying embodiment. In the method or process of FIG. 6, details of a user plane or traffic procedure are outlined, which exemplifies how a stream splitting function (SSF) for FRER support is performed/realized at UPF/NW-TT.

For each frame/packet of an input stream (which may be a single/original TSN stream or a member stream of a compound stream resulting from a preceding SSF processing) that arrives at a specific port or through a PDU session at the UPF, the following steps are performed.

The header is examined to identify if this input stream has to be transformed into two or more member streams, i.e. whether this input stream is a stream subject to processing based on the FRER functionality, such as the SSF function in the present example. For this purpose, active stream identification is performed to derive the stream ID and then it is checked if this ID is part of the frerSplitInputIdList parameter. This is an example corresponding to operation S310 in FIG. 3 above.

If no, i.e. if the stream to which the frame/packet belongs is not identified as a stream subject to processing based on the FRER functionality, such as the SSF function in the present example, the method or process proceeds with a procedure according to 3GPP Rel. 16, as indicated in the dashed box. That is, the FRER functionality is not applied to the frame/packet. This is the case when the input stream is a TSN stream not involving or exhibiting FRER functionality or configuration.

If yes, i.e. if the stream to which the frame/packet belongs is identified as a stream subject to processing based on the FRER functionality, such as the SSF function in the present example, the method or process proceeds as follows.

The input stream is transformed into member streams. Namely, one member stream is created for each entry in the frerSplitOutputIdList. Also, the R-Tag (redundancy tag) is added to the frame/packet (in case the input stream is a single/original TSN stream, while a R-Tag is already present and is thus kept in case the input stream is already a member stream of a compound stream resulting from a preceding SSF processing). It is to be noted that in the aforementioned SDF option the above information is configured using the PDR and FAR rules, respectively, at the UPF by the SMF, while in the aforementioned transparent option the needed parameters are provided by the TSN AF to the NW-TT.

Each of the new member streams have their own QoS requirements. These are provided by the TSN AF separately as part of the Qbv or Qci configurations for the streams.

The destination address of the member stream can be used to identify the egress port through which each member streams is to be transmitted. The egress port can be in the UPF or in the UE. The port binding information is used to place the frame/packet in the correct PDU session. It is to be noted that this mapping corresponds to a 3GPP Rel. 16 procedure defined for any TSN stream. As described above, the SMF configures the UPF with the PDR and FAR rules to forward frames/packets with specific destination MAC address to specific set of PDU sessions In the following, various examples and options for FRER deployments and implementations/realizations according to exemplifying embodiments of the present disclosure are described by way of example for illustrative purposes. However, it is to be noted that the present disclosure is not limited to these examples and options.

Generally, it is noted that 5GS, i.e. a TSN bridge realization by 5GS, provides for flexibility which can be utilized according to the present disclosure. For example, the 5GS TSN bridge supports the ability to do a flexible assignment of the splitting and merging functions (namely SSF, SRF) within UPF/NW-TT that belongs to the user plane within the 5GS TSN bridge. These functions shall be realized in (at least) one of the network entities or functional entities of the 5GS TSN bridge such that the resources for transmission of frames/packets of the created two or more streams (in case of SSF) or the single recovered/reconstituted stream (in case of SRF) is optimized in the 5GS TSN. In this regard, optimization criteria can be to reduce the number of transmissions through the air interface and/or the signaling overhead. This can apply to the DS-TT (UE/DS-TT) and NW-TT (UPF/NW-TT) hosting the ingress and egress ports, a UE, gNB, UPF or any combination thereof.

For each configuration of SSF/SRF, there may be more than one implementation option, e.g. SRF in downlink may be implemented by merging the streams at the NW-TT or forwarding frames/packets through multiple PDU sessions and then merging the streams at the DS-TT.

Based on the requirements on the 5GS TSN bridge in terms of reliability, resilience, etc., the 5GS TSN bridge may configure the SRF/SSF at the DS-TT (UE/DS-TT) and/or the NW-TT (UPF/NW-TT). The decision criteria is up to implementation while the user plane or signaling procedure can be according to the present disclosure.

In FIGS. 7 to 11, the E2E scenario/overview of the FRER deployment I depicted in the upper part and the FRER realization within the 5GS TSN bridge is depicted in the upper part, respectively.

Figure 7:
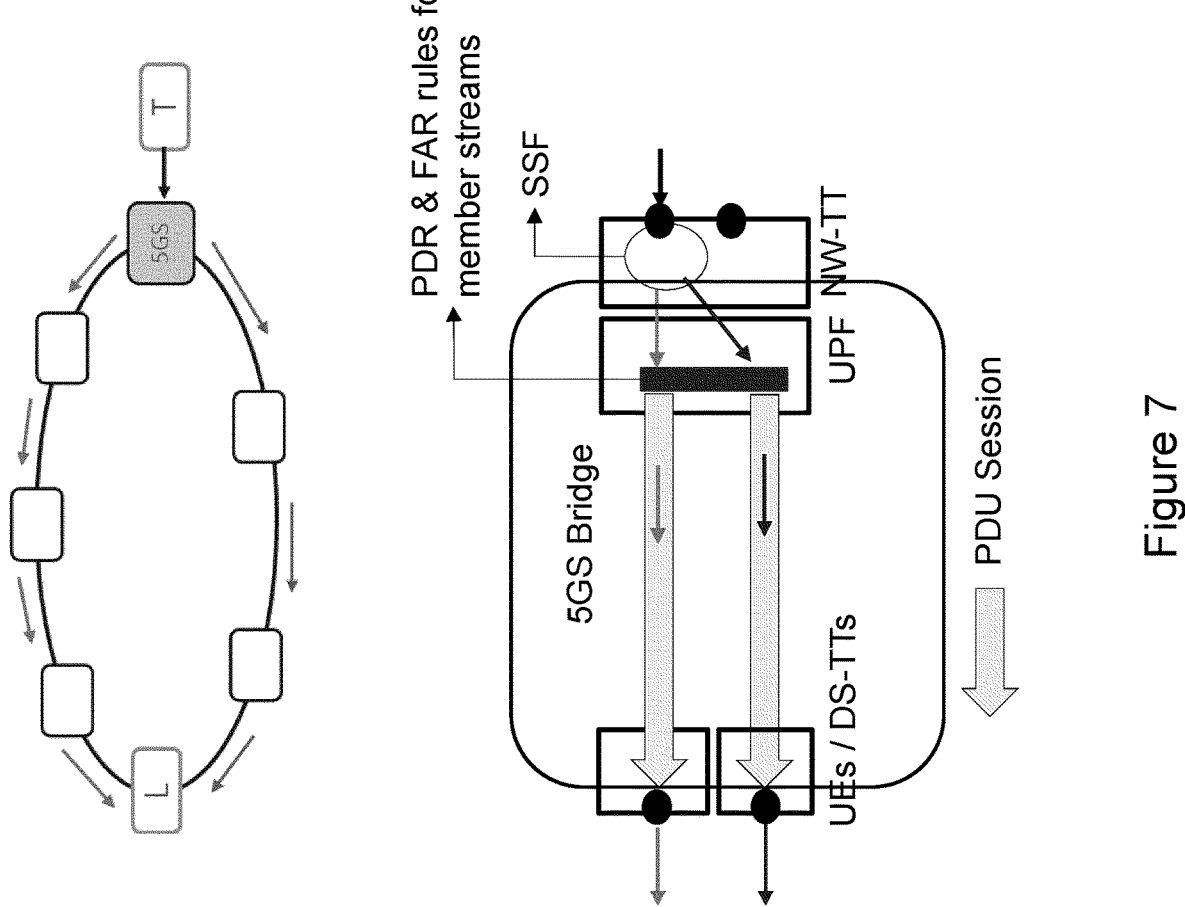
FIG. 7 shows a schematic diagram illustrating an example of the functionality at a 5GS TSN bridge realizing a stream splitting function in a FRER deployment according to at least one exemplifying embodiment.

FIG. 7 shows a schematic diagram illustrating an example of the functionality at a 5GS TSN bridge realizing a stream splitting function in a FRER deployment according to at least one exemplifying embodiment. Here, it is assumed that the SSF function (i.e. stream replication/duplication) is performed/realized at the UPF/NW-TT, while the egress ports of the created member streams are on the UE side.

In FIG. 7, the 5GS TSN bridge receives a single input stream. At the NW-TT, the (here e.g. two) member streams are constructed from the single input stream. The PDR and FAR rules defined at the UPF map the frames/packets of these member streams to the corresponding PDU session. The frames/packets of these member streams are transferred to their respective egress ports at the UEs/DS-TTs via the corresponding PDU session.

Figure 8:
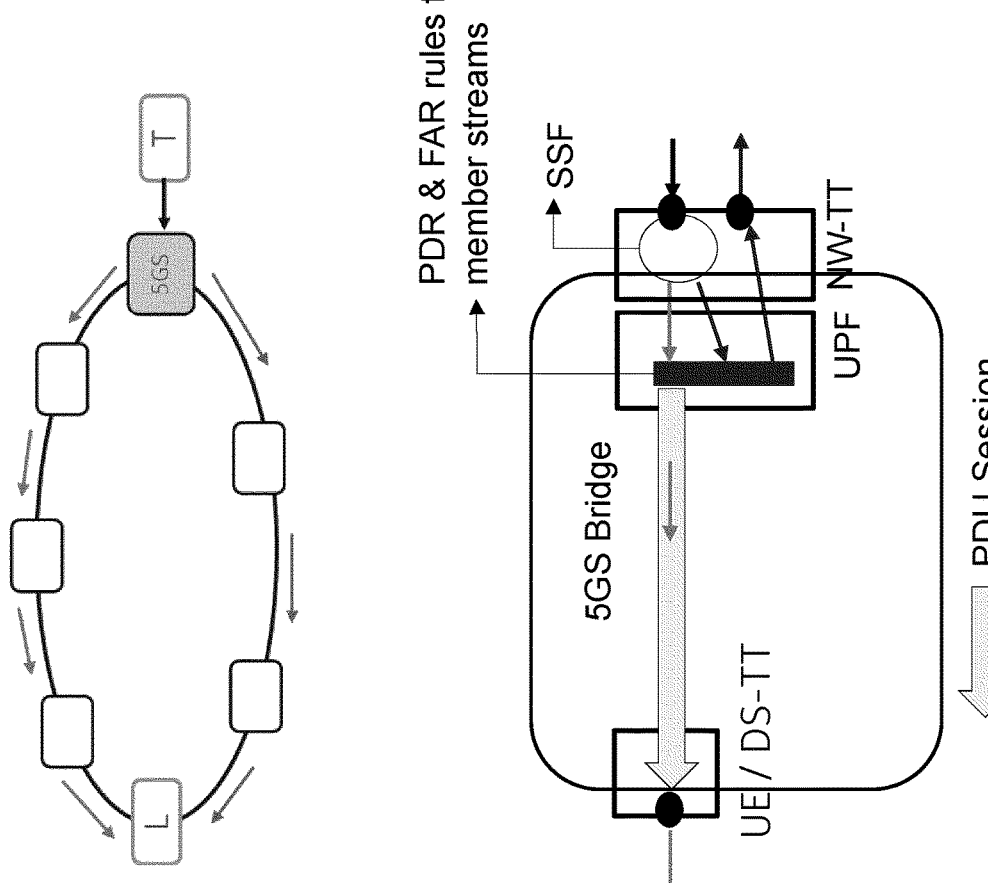
FIG. 8 shows a schematic diagram illustrating an example of the functionality at a 5GS TSN bridge realizing a stream splitting function in a FRER deployment according to at least one exemplifying embodiment.

FIG. 8 shows a schematic diagram illustrating an example of the functionality at a 5GS TSN bridge realizing a stream splitting function in a FRER deployment according to at least one exemplifying embodiment. Here, it is assumed that the SSF function (i.e. stream replication/duplication) is performed/realized at the UPF/NW-TT, while the egress ports of the created member streams are both on the UE side and the network side. Namely, it is assumed that the egress port which connects the 5GS TSN bridge with one of the next-hop bridges is on the NW-TT side.

In FIG. 8, the 5GS TSN bridge receives a single input stream. At the NW-TT, the (here e.g. two) member streams are constructed from the single input stream. The PDR and FAR rules defined at the UPF process the frames/packets of these member streams. Like in FIG. 7, the frames/packets of the one member stream are mapped to the corresponding PDU session so as to be transferred to their egress port at the UE/DS-TT via the corresponding PDU session. However, the frames/packets of the other member stream are forwarded, via the UPF, to the corresponding egress port at the NW-TT.

Another option is that the SSF function at the NW-TT directly forwards the frames/packets of the other member stream to the corresponding egress port at the NW-TT, without going via the UPF (wherein, in this case, the PDR and FAR rules need to be configured at the UPF only for the one member stream).

Figure 9:
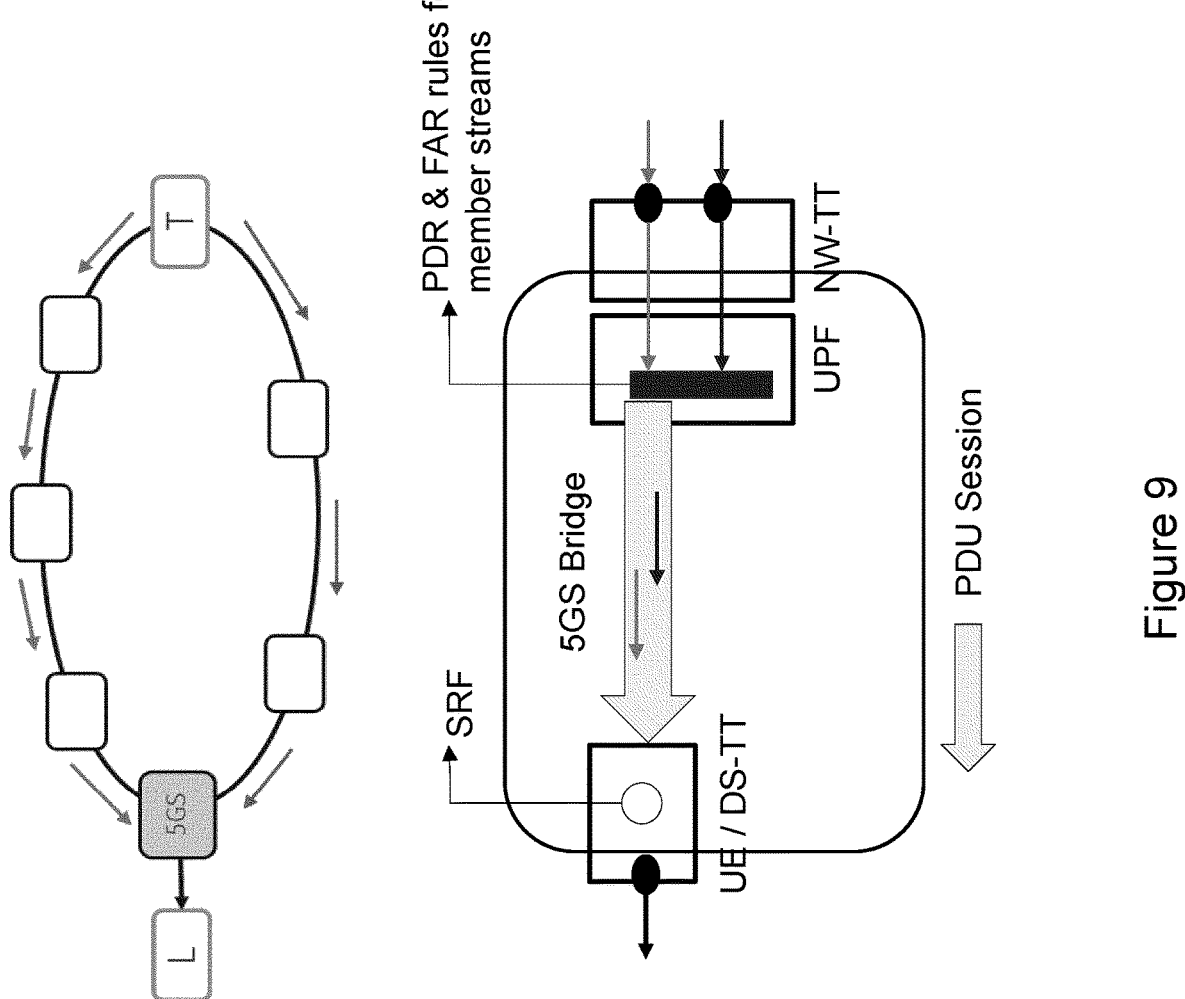
FIG. 9 shows a schematic diagram illustrating an example of the functionality at a 5GS TSN bridge realizing a sequence recovery function in a FRER deployment according to at least one exemplifying embodiment.

FIG. 9 shows a schematic diagram illustrating an example of the functionality at a 5GS TSN bridge realizing a sequence recovery function in a FRER deployment according to at least one exemplifying embodiment. Here, it is assumed that the SRF function (i.e. stream merging/joining) is performed/realized at the UE/DS-TT. Namely, it is assumed that the 5GS TSN bridge is the last-hop bridge (in the FRER functionality of the input stream concerned) which merges the (here e.g. two) two member streams and recovers the original TSN stream.

In FIG. 9, within the 5GS TSN bridge, the two member streams are transported to the UE using the same PDU session. This example is in accordance with the 3GPP Rel. 16 feature that there is one PDU session per UE port-UPF pair. However, it is also possible to have multiple PDU sessions each carrying different member streams, namely the member streams can be transported from the UPF to the UE via redundant PDU sessions with overlapping or non-overlapping paths as defined in 3GPP 23.725 V16.2.0 (the contents of which is herewith incorporated by reference). At the UE/DS-TT, the two member streams are merged by the thus configured SRF function.

In the example of FIG. 9, the member streams are transmitted to the UE/DS-TT and recovered at the UE/DS-TT, namely at the egress of the 5GS TSN bridge. Then, the PDU session(s) carrying the recovered stream have a particular QoS (can be one PDU session or multiple PDU session), which can be established corresponding to the FRER configuration.

Figure 10:
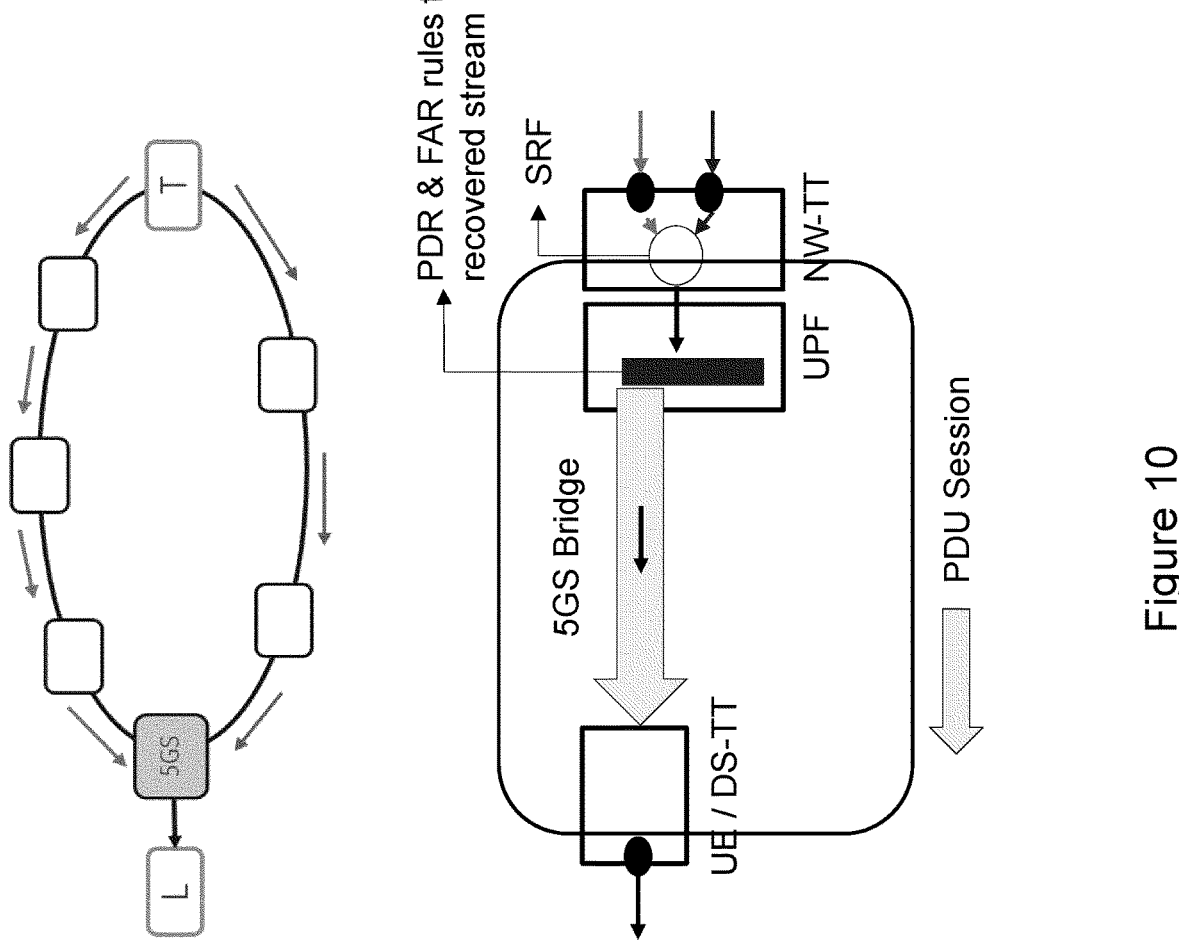
FIG. 10 shows a schematic diagram illustrating an example of the functionality at a 5GS TSN bridge realizing a sequence recovery function in a FRER deployment according to at least one exemplifying embodiment.

FIG. 10 shows a schematic diagram illustrating an example of the functionality at a 5GS TSN bridge realizing a sequence recovery function in a FRER deployment according to at least one exemplifying embodiment. Here, it is assumed that the SRF function (i.e. stream merging/joining) is performed/realized at the UE/DS-TT. Namely, it is assumed that the 5GS TSN bridge is the last-hop bridge (in the FRER functionality of the input stream concerned) which merges the (here e.g. two) two member streams and recovers the original TSN stream. Hence, FIG. 10 shows a different/alternative implementation/realization for the same scenario as considered in FIG. 9. Like in FIG. 8 (as compared with FIG. 7), the frames/packets of the recovered stream can be forwarded, via the UPF, to the corresponding egress port at the NW-TT, or the SRF function at the NW-TT can directly forward the frames/packets of the recovered stream to the corresponding egress port at the NW-TT, without going via the UPF.

In FIG. 10, the SRF is configured at the NW-TT, and the PDR and FAR rules are updated to consider the recovered/reconstituted stream. In this case, there is only one stream transmitted through the 5GS TSN bridge, i.e. between PDF/NW-TT and UE/DS-TT.

As compared with the implementation/realization of FIG. 9, the implementation/realization of FIG. 10 can be beneficial due to the fact that in 5GS the UPF/NW-TT acts as the central entity to realize most of the TSN functionality, and efficient use of the 5GS resources.

In the example of FIG. 10, the member streams are already recovered at the UPF/NW-TT, namely at the ingress of the 5GS TSN bridge (possibly despite the fact that the FRER configuration tells the 5GS TSN bridge to do it at the egress, like in FIG. 9). In this case, the 5GS TSN bridge can derive and establish the QoS for the single recovered PDU session, the QoS flow based on the PDU session, the QoS flows of the member streams, e.g. increasing reliability of QoS flow, accordingly.

It is to be noted that transmitting the frames/packets twice (in/for two member streams) than once (in/for one recovered/reconstituted TSN stream) shall be better from a reliability point of view. However, from FRER perspective, the member streams are created to enhance the E2E reliability, especially to avoid a single point of failure, and not to improve the reliability of the bridge as such. To improve reliability of the 5GS TSN bridge, the reliability enhancements defined for URLLC can be used in/for the 5GS TSN bridge. These can be used for any TSN stream independent of whether or nor FRER is deployed for that TSN stream. For example, it is possible that the TSN AF can request PDU session modification with a higher reliability value, e.g. a doubled reliability value. In this case, the QCI value provided by the TSN AF (see FIGS. 4 and 5 and their associated description) can be updated appropriately. This also mean that a dedicated QoS flow is established for FRER in order to avoid that all the other TSN streams are transmitted with the higher QCI setting as well.

Figure 11:
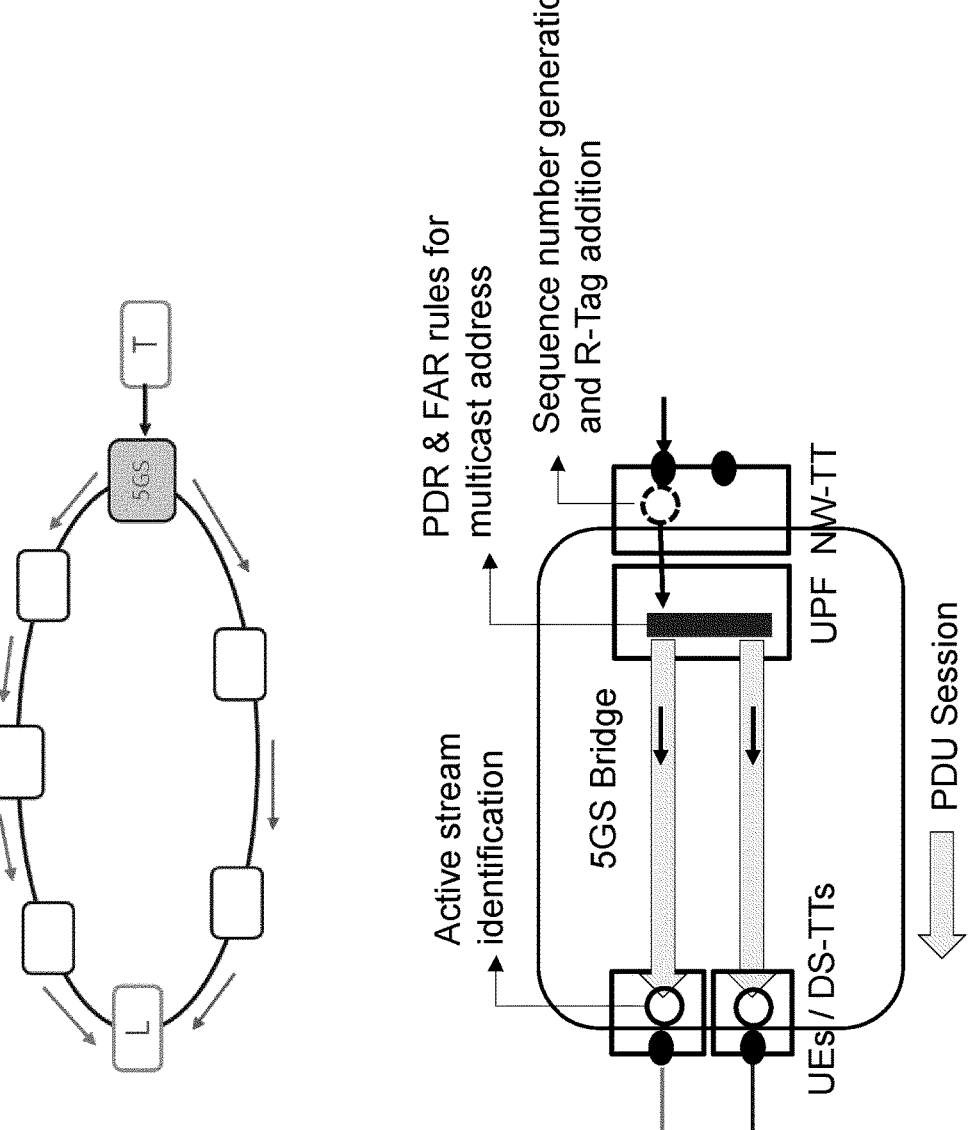
FIG. 11 shows a schematic diagram illustrating an example of the functionality at a 5GS TSN bridge realizing a stream splitting function in a FRER deployment according to at least one exemplifying embodiment.

FIG. 11 shows a schematic diagram illustrating an example of the functionality at a 5GS TSN bridge realizing a stream splitting function in a FRER deployment according to at least one exemplifying embodiment. Here, it is assumed that the SSF function (i.e. stream replication/duplication) is performed/realized at the UPF/NW-TT, while the egress ports of the created member streams are on the UE side. Hence, FIG. 11 shows a different/alternative implementation/realization for the same scenario as considered in FIG. 7. Like in FIG. 8 (as compared with FIG. 7), the frames/packets of at least one member stream can be forwarded, via/by the UPF, to the corresponding egress port at the NW-TT.

As compared with the implementation/realization of FIG. 7, the implementation/realization of FIG. 11 applies/extends a multicasting mechanism to support the FRER functionality. Namely, the multicasting functionality of the 5GS TSN bridge is used to create multiple copies of the input stream at the UPF, not the NW-TT.

Here, the frames/packets of the input stream are transferred with the R-Tag to the UEs/DS-TTs on the device side. As explained above, sequence number generation and R-Tag addition is only performed at NW-TT when the input stream is not a member stream (i.e. does not contain a R-Tag). Then, at the UEs/DS-TTs, active stream identification functionality as defined in IEEE Std 802.1CB is used to change the Ethernet header (e.g. destination MAC address, VLAN ID, PCP value) of the copies, thereby constructing the required member streams. It is to be noted that in this case the R-Tag which includes a sequence number may already be added at the NW-TT. This is because, if one or more frames/packets in either of the PDU sessions is lost, then this leads to a mismatch in the sequence number between the member streams' frames/packets. Alternatively, the sequence number can be appended when required to the frames/packets and the R-Tag can be created at each UE/DS-TT using the appended information.

Accordingly, the sequence splitting is realized in two steps: Firstly, the multicast address used results in two copies of the stream, which are sent to UEs/DS-TTS, such as UE1 and UE2. Secondly, active stream identification is used to change the destination MAC address of the two streams, thereby effectively creating two member streams.

By virtue of exemplifying embodiments of the present disclosure, as evident from the above, FRER support of a wireless communication system operable as a TSN bridge, such as e.g. FRER support of a 5GS TSN bridge, can be enabled/realized.

As explained above, the present disclosure provides for various measures/mechanisms (such as functions, extensions of functions and procedures) that enable a wireless communication system (e.g. 5GS) TSN bridge, when it receives FRER configuration information from a control entity, e.g. centralized network configuration (CNC), to process this information and translate it into a proper configuration for supporting the FRER functionality and behave/operate in accordance with the (thus configured) FRER functionality. That is, the present disclosure addresses both the configuration (i.e. the control plane or signaling procedure) and the behavior/operation (i.e. the user plane or traffic procedure) for a wireless-communication-system TSN bridge such as a 5GS TSN bridge so as to support the TSN FRER functionality.

As explained above, the present disclosure teaches, for example, how streams need to be handled (in/for one or more PDU sessions), how streams are mapped to PDU sessions, how the forwarding is done, and how this is mapped to the configuration of SSF/SRF (which may be placed at ingress or egress ports depending on the features used within the bridge. As shown, it is for example not always appropriate to place the SSF function at the ingress port of the bridge and the SRF function at egress port of the bridge as this would have negative impact on system performance. To this end, it is taught that and how a FRER configuration can be transformed, mapped and established/realized within a wireless-communication-system TSN bridge such as a 5GS TSN bridge such that the bridge is properly configured and properly behaves/operates in accordance with the FRER configuration.

Accordingly, the present disclosure enables that a wireless communication system (e.g. 5GS) TSN bridge can configure the SSF and/or SRF functions (based on a FRER configuration) as appropriate for or from the perspective of the bridge, i.e. the wireless communication system representing the bridge. That is, the wireless communication system (e.g. 5GS) TSN bridge can configure the SSF and/or SRF functions where desired or appropriate (i.e. at one or more desired/appropriate network or functional entities thereof) in a desired or appropriate manner (such as to optimize e.g. radio resources, enhance reliability or availability, etc.). Amongst others, this is evident from the various examples and options for FRER deployments and implementations/realizations, as described in connection with FIGS. 7 to 11.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, network nodes and/or systems, including both software and/or hardware thereof.

Respective exemplifying embodiments of the present invention are described below referring to FIGS. 12 to 14, while for the sake of brevity reference is made to the detailed description of respective corresponding configurations/setups, schemes, processes, sequences, methods as well as functionalities, principles and operations according to FIGS. 1 to 11.

Figure 12:
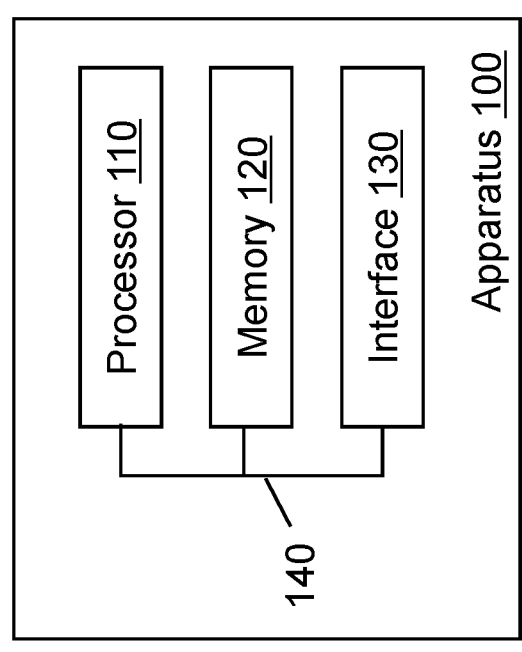
FIG. 12 shows a schematic diagram illustrating an example of a (constructional) structure of an apparatus according to at least one exemplifying embodiment.
Figure 13:
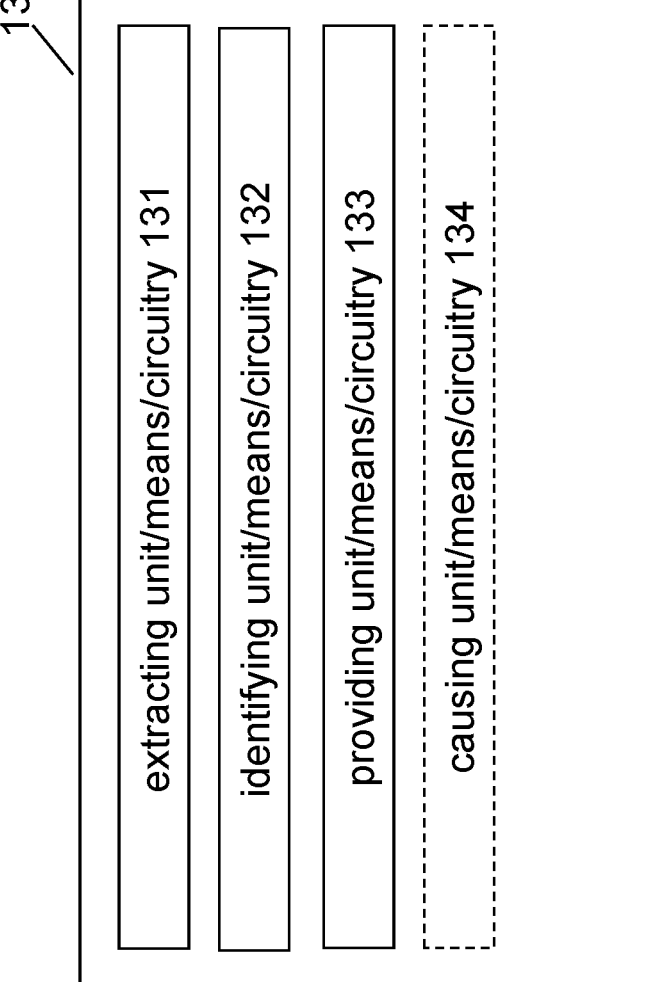
FIG. 13 shows a schematic diagram illustrating an example of a (functional) structure of an apparatus according to at least one exemplifying embodiment.
Figure 14:
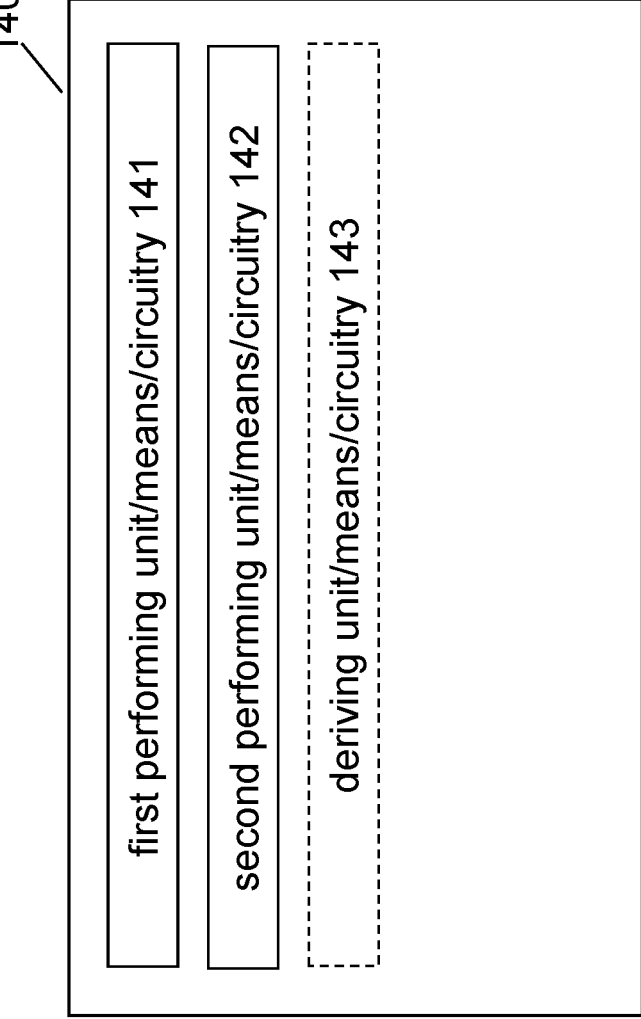
FIG. 14 shows a schematic diagram illustrating an example of a (functional) structure of an apparatus according to at least one exemplifying embodiment.

In FIGS. 12 to 14, the blocks are basically configured to perform respective methods, procedures and/or functions as described above. The entirety of blocks are basically configured to perform the methods, procedures and/or functions as described above, respectively. With respect to FIGS. 12 to 14, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIGS. 12 to 14, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

FIG. 12 shows a schematic diagram illustrating an example of a (constructional) structure of an apparatus according to at least one exemplifying embodiment. Herein, an apparatus can represent a physical entity, i.e. a structural device implementing a specific network element, entity or function or the functionality thereof as such.

As indicated in FIG. 12, according to at least one exemplifying embodiment, an apparatus 100 may comprise at least one processor 110 and at least one memory 120 (and possibly also at least one interface 130), which may be operationally connected or coupled, for example by a bus 140 or the like, respectively.

The processor 110 and/or the interface 130 of the apparatus 100 may also include a modem or the like to facilitate communication over a (hardwire or wireless) link, respectively. The interface 130 of the apparatus 100 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 130 of the apparatus 100 is generally configured to communicate with at least one other apparatus, device, node or entity (in particular, the interface thereof), i.e. to establish a link or connection to another apparatus, device, node or entity (in particular, the interface thereof).

The memory 120 of the apparatus 100 may represent a (non-transitory/tangible) storage medium (e.g. RAM, ROM, EPROM, EEPROM, etc.) and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present invention. Further, the memory 120 of the apparatus 100 may (comprise a database to) store any data, information, or the like, which is used in the operation of the apparatus.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 100 is suitable for use in practicing one or more of the exemplifying embodiments, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function. It should be appreciated that herein processors, or more generally processing portions, should not be only considered to represent physical portions of one or more processors, but may also be considered as a logical division of the referred processing tasks performed by one or more processors.

According to at least one exemplifying embodiment, the thus illustrated apparatus 100 may represent or realize/embody a (part of a) network entity or functional entity of a wireless communication system operable as a TSN bridge, such as a 5GS TSN bridge. Hence, the apparatus 100 may be configured to perform a procedure and/or exhibit a functionality and/or implement a mechanism, as described in any one of FIGS. 1 to 11.

In terms of the bridge configuration aspect of the present disclosure (i.e. a technique of/for configuring a wireless communication system, which is operable as a bridge entity in a time-sensitive networking environment, for supporting a frame replication and elimination for reliability, FRER, functionality), the apparatus 100 may be caused or the apparatus 100 or its at least one processor 110 (possibly together with computer program code stored in its at least one memory 120), in its most basic form, may be configured to extract, from a FRER configuration of the time-sensitive networking environment, parameters relating to a stream identification function and at least one of a stream splitting function and a sequence recovery function, to identify at least one network entity of the wireless communication system, at which the at least one of the stream splitting function and the sequence recovery function is to be realized, using the extracted parameters, and to provide, for the identified at least one network entity of the wireless communication system, FRER-related configuration information, including at last part of the extracted parameters, for enabling realization of the stream identification function and the at least one of the stream splitting function and the sequence recovery function.

In terms of the bridge behavior/operation aspect of the present disclosure (i.e. a technique of/for processing time-sensitive networking traffic in a wireless communication system, which is operable as a bridge entity in a time-sensitive networking environment, based on a frame replication and elimination for reliability, FRER, functionality), the apparatus 100 may be caused or the apparatus 100 or its at least one processor 110 (possibly together with computer program code stored in its at least one memory 120), in its most basic form, may be configured to perform a stream identification function of identifying, for an arriving frame, whether a stream to which the frame belongs is a stream subject to processing based on the FRER functionality using at least one FRER-related configuration parameter relating to stream identification, and to perform at least one of a stream splitting function and a sequence recovery function on the frame, if the stream to which the frame belongs is identified as a stream subject to processing based on the FRER functionality, using at least one FRER-related configuration parameter relating to stream splitting or sequence recovery.

As mentioned above, an apparatus according to at least one exemplifying embodiment may be structured by comprising respective units or means for performing corresponding operations, procedures and/or functions. For example, such units or means may be implemented/realized on the basis of an apparatus structure, as exemplified in FIG. 12, i.e. by one or more processors 110, one or more memories 120, one or more interfaces 130, or any combination thereof.

FIG. 13 shows a schematic diagram illustrating an example of a (functional) structure of an apparatus according to at least one exemplifying embodiment.

As shown in FIG. 13, an apparatus 130 according to at least one exemplifying embodiment may represent or realize/embody an apparatus with the functionality as described in FIG. 2 or, by way of example, for TSN AF in FIGS. 4 to 11. Accordingly, such apparatus 130 may comprise (at least) extracting unit/means/circuitry 131, which represents any implementation for (or configured to) extracting (extract), from a FRER configuration of the time-sensitive networking environment, parameters relating to a stream identification function and at least one of a stream splitting function and a sequence recovery function, identifying unit/means/circuitry 132, which represents any implementation for (or configured to) identifying (identify) at least one network entity of the wireless communication system, at which the at least one of the stream splitting function and the sequence recovery function is to be realized, using the extracted parameters, and providing unit/means/circuitry 133, which represents any implementation for (or configured to) providing (provide), for the identified at least one network entity of the wireless communication system, FRER-related configuration information, including at least part of the extracted parameters, for enabling realization of the stream identification function and the at least one of the stream splitting function and the sequence recovery function.

As indicated by a dashed box, such apparatus 130 may also comprise causing unit/means/circuitry 134, which represents any implementation for (or configured to) causing (cause) establishment of at least one quality-of-service flow, corresponding to a quality-of-service defined in the FRER configuration, for each stream of time-sensitive network traffic, which is subject to the FRER functionality and transported in the wireless communication system, and/or causing (cause) configuration of a service data flow for carrying each stream of time-sensitive network traffic, which is subject to the FRER functionality and transported in the wireless communication system, by deriving at least one of a packet detection rule and a forwarding action rule corresponding to stream forwarding information and/or stream filtering and policing information.

FIG. 14 shows a schematic diagram illustrating an example of a (functional) structure of an apparatus according to at least one exemplifying embodiment.

As shown in FIG. 14, an apparatus 140 according to at least one exemplifying embodiment may represent or realize/embody an apparatus with the functionality as described in FIG. 3 or, by way of example, for UPF/NW-TT or UE/DS-TT in FIGS. 4 to 11. Accordingly, such apparatus 140 may comprise (at least) first performing unit/means/circuitry 141, which represents any implementation for (or configured to) performing (perform) a stream identification function of identifying, for an arriving frame, whether a stream to which the frame belongs is a stream subject to processing based on the FRER functionality using at least one FRER-related configuration parameter relating to stream identification, and second performing unit/means/circuitry 142, which represents any implementation for (or configured to) performing (perform) at least one of a stream splitting function and a sequence recovery function on the frame, if the stream to which the frame belongs is identified as a stream subject to processing based on the FRER functionality, using at least one FRER-related configuration parameter relating to stream splitting or sequence recovery.

As indicated by a dashed box, such apparatus 140 may also comprise deriving unit/means/circuitry 143, which represents any implementation for (or configured to) deriving (derive) at least one of a packet detection rule and a forwarding action rule corresponding to stream forwarding information and/or stream filtering and policing information.

For further details regarding the operability/functionality of the apparatuses (or units/means thereof) according to exemplifying embodiments, reference is made to the above description in connection with any one of FIGS. 1 to 11, respectively.

According to exemplifying embodiments of the present disclosure, any one of the (at least one) processor, the (at least one) memory and the (at least one) interface, as well as any one of the illustrated units/means, may be implemented as individual modules, chips, chipsets, circuitries or the like, or one or more of them can be implemented as a common module, chip, chipset, circuitry or the like, respectively.

According to exemplifying embodiments of the present disclosure, a system may comprise any conceivable combination of any depicted or described apparatuses and other network elements or functional entities, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, a basic system architecture of a (tele)communication network including a wireless or mobile communication system where some examples of exemplifying embodiments are applicable may include an architecture of one or more communication networks including wireless access network sub-/system(s) and possibly core network(s). Such an architecture may include one or more communication network control elements or functions, such as e.g. access network elements, radio access network elements, access service network gateways or base transceiver stations, like a base station, an access point, a NodeB (NB), an eNB or a gNB, a distributed or a centralized unit, which controls a respective coverage area or cell(s) and with which one or more communication stations such as communication elements or functions, like user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. It should be appreciated that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network architecture as being considered in examples of exemplifying embodiments may also be able to communicate with other networks, such as a public switched telephone network or the Internet, including the Internet-of-Things. The communication network may also be able to support the usage of cloud services for virtual network elements or functions thereof, wherein it is to be noted that the virtual network part of the (tele)communication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage. Generally, a network function can be implemented either as a network element on a dedicated hardware, as a software instance running on a dedicated hardware, or as a virtualized function instantiated on an appropriate platform, e.g. a cloud infrastructure.

Any method step is suitable to be implemented as software or by hardware without changing the idea of the present disclosure. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing FRER support of a wireless communication system operable as a TSN bridge, such as e.g. FRER support of a 5GS TSN bridge. Such measures exemplarily comprise configuration of a wireless communication system operable as a TSN bridge, such as e.g. a 5GS TSN bridge, for supporting FRER functionality, wherein parameters relating to a stream identification function and at least one of a stream splitting function and a sequence recovery function are extracted from a FRER configuration, at least one network entity is identified, and FRER-related configuration information is provided for the identified at least one network entity, including at last part of the extracted parameters, for enabling realization of the stream identification function and the at least one of the stream splitting function and the sequence recovery function.

Even though the present disclosure is described above with reference to the examples according to the accompanying drawings, it is to be understood that the present disclosure is not restricted thereto. Rather, it is apparent to those skilled in the art that the present disclosure can be modified in many ways without departing from the scope of the inventive idea as disclosed herein.

List of Acronyms and Abbreviations

3GPP 3rd Generation Partnership Project
5GS 5$^{th}$ Generation System
AF Application Function
BMIC Bridge Management Information Container
CNC Centralized Network Configuration/Controller
CUC Centralized User Configuration/Controller
DL Downlink
DS-TT Device-side TSN Translator
E2E End-to-End
FAR Forwarding Action Rule
FRER Frame Replication and Elimination for Reliability
GPRS General Packet Radio System
GTP-U GPRS Tunneling Protocol User Plane
IEEE Institute of Electrical and Electronics Engineers
ID Identifier/Identification
(I)IoT (Industrial) Internet-of-Things
MAC Medium Access Control
MIB Management Information Block
NW-TT Network-side TSN Translator
PCF Policy Control Function
PCP Priority Code Point
PDCP Packet Data Convergence Protocol
PDR Packet Detection Rule
PDU Packet Data Unit
PMIC Port Management Information Container
PSFP Per-stream Filtering and Policing
QCI QoS Class Identifier
QoS Quality-of-Service
SDF Service Data Flow
SIF Stream Identification Function
SMF Session Management Function
SRF Sequence Recovery Function
SSF Stream Splitting Function
TSN Time-Sensitive Networking
UE User Equipment
UL Uplink
UPF User Plane Function
URLLC Ultra-Reliable Low-Latency Communication
VLAN Virtual Local Area Network

The invention claimed is:

1. An apparatus comprising:

at least one processor; and at least one memory including a computer program code,
    wherein the at least one memory and the computer program code are configured, with the at least one processor, to cause the apparatus to:
    perform configuring a wireless communication system, which is operable as a bridge entity in a time-sensitive networking environment, for supporting a frame replication and elimination for reliability, FRER, functionality, including:
        extracting, from a FRER configuration of the time-sensitive networking environment, parameters relating to a stream identification function and at least one of a stream splitting function and a sequence recovery function,
        wherein the extracting comprises extracting and grouping the parameters corresponding to at least one port of at least one network entity of the wireless communication system, wherein the FRER configuration comprises parameters relating to at least one input stream, at least one output stream, at least one ingress port for receiving the at least one input stream, at least one egress port for forwarding the at least one output stream, such as in at least one of a stream splitting table and a sequence recovery table;

identifying at least one network entity of the wireless communication system, at which the at least one of the stream splitting function and the sequence recovery function is to be realized, using the extracted parameters, wherein the identifying comprises identifying one or more ports, at which the at least one of the stream splitting function and the sequence recovery function is to be realized, using the extracted parameters;

providing, for the identified at least one network entity of the wireless communication system, FRER-related configuration information, including at least part of the extracted parameters, for enabling realization of the stream identification function and the at least one of the stream splitting function and the sequence recovery function, wherein the providing comprises mapping the FRER-related configuration information into service data flow information and action rules and causing, using the service data flow information and action rules, realization of a service data flow for deriving and providing at least one of a packet detection rule and a forwarding action rule corresponding to the FRER-related configuration information, wherein enabling realization of the stream splitting function comprises enabling mapping of at least one member stream of time-sensitive network traffic, which results from the stream splitting function, to at least one packet data unit session in the wireless communication system and at least one egress port of the identified at least one network entity of the wireless communication system, wherein the at least one packet data unit session and the at least one egress port for mapping are selected using criteria including a destination medium access control address of a stream, stream forwarding information, and port binding information defining binding between port and packet data unit session, and wherein enabling realization of the sequence recovery function comprises enabling mapping of an output stream, which results from the sequence recovery function, to a packet data unit session in the wireless communication system or an egress port of the identified at least one network entity of the wireless communication system;

causing establishment of at least one quality-of-service flow, corresponding to a quality-of-service defined in the FRER configuration, for each stream of time-sensitive network traffic, which is subject to the FRER functionality and transported in the wireless communication system; and causing configuration of a service data flow for carrying each stream of time-sensitive network traffic, which is subject to the FRER functionality and transported in the wireless communication system, by deriving at least one of a packet detection rule and a forwarding action rule corresponding to stream forwarding information and/or stream filtering and policing information.

* * * * *